United States Patent
Futa et al.

(10) Patent No.: US 8,452,975 B2
(45) Date of Patent: May 28, 2013

(54) SIGNATURE AND VERIFICATION METHOD, SIGNATURE GENERATION DEVICE, AND SIGNATURE VERIFICATION DEVICE

(75) Inventors: Yuichi Futa, Osaka (JP); Hiroki Shizuya, Miyagi (JP); Shuji Isobe, Miyagi (JP); Shingo Hasegawa, Miyagi (JP)

(73) Assignee: Panasonic Corporation, Osaka (JP)

( * ) Notice: Subject to any disclaimer, the term of this patent is extended or adjusted under 35 U.S.C. 154(b) by 345 days.

(21) Appl. No.: 12/921,507

(22) PCT Filed: Mar. 2, 2009

(86) PCT No.: PCT/JP2009/000923
§ 371 (c)(1),
(2), (4) Date: Sep. 8, 2010

(87) PCT Pub. No.: WO2009/125537
PCT Pub. Date: Oct. 15, 2009

(65) Prior Publication Data
US 2011/0016325 A1    Jan. 20, 2011

(30) Foreign Application Priority Data
Apr. 9, 2008  (JP) ................................. 2008-101281

(51) Int. Cl.
*H04L 29/06*  (2006.01)
(52) U.S. Cl.
USPC .............. 713/180; 713/170; 713/176; 380/44
(58) Field of Classification Search
None
See application file for complete search history.

(56) References Cited

U.S. PATENT DOCUMENTS

| 6,081,597 A | 6/2000 | Hoffstein et al. |
| 6,298,137 B1 | 10/2001 | Hoffstein et al. |
| 6,959,085 B1 * | 10/2005 | Hoffstein et al. ............... 380/30 |

(Continued)

FOREIGN PATENT DOCUMENTS

| JP | 2000-516733 | 12/2000 |
| JP | 2002-230202 | 8/2002 |

(Continued)

OTHER PUBLICATIONS

Y. Hu, et al. "NTRUSign With a New Perturbation," IEEE Transactions on Information Theory, vol. 54 No. 7, Jul. 2008, pp. 3216-3221.*

(Continued)

*Primary Examiner* — Jung Kim
*Assistant Examiner* — Robert Leung
(74) *Attorney, Agent, or Firm* — Wenderoth, Lind, Ponack, L.L.P.

(57) ABSTRACT

The present invention provides a signature generation device and a signature verification device capable of countering a transcript attack that seeks a private key by analyzing a plurality of signed documents (pairs of a message and a signature) signed using the NTRUSign signature scheme. The signature generation device calculates a hash value vector H of message data, adds a vector based on a private distribution to the hash value vector H to calculate a converted hash value vector H', and seeks, as a signature vector S, the closest lattice point to the converted hash value vector H' in a lattice defined by private key basis vectors. The signature verification device determines whether the distance between the hash value vector H of the message data and the signature vector S is equal to or less than L' and, if so, recognizes the message data as valid.

20 Claims, 22 Drawing Sheets

U.S. PATENT DOCUMENTS

| | | | |
|---|---|---|---|
| 7,308,097 | B2 | 12/2007 | Hoffstein et al. |
| 7,739,504 | B2 | 6/2010 | Futa et al. |
| 2004/0151309 | A1 | 8/2004 | Gentry et al. |
| 2009/0070590 | A1 | 3/2009 | Hoffstein et al. |

FOREIGN PATENT DOCUMENTS

| | | |
|---|---|---|
| JP | 2004-526387 | 8/2004 |
| JP | 2005-72917 | 3/2005 |
| JP | 2006-53715 | 2/2006 |
| JP | 2007-288230 | 11/2007 |
| WO | 03/050998 | 6/2003 |
| WO | 2006/114948 | 11/2006 |

OTHER PUBLICATIONS

N. Gama, "New Chosen-Ciphertext Attacks on NTRU," In: Okamoto, T., Wang, X. (eds.) PKC 2007. LNCS, vol. 4450, pp. 89-106. Springer, Heidelberg (2007).*

C. Gentry, "Cryptanalysis of the Revised NTRU Signature Scheme," Proc. of Eurocrypt'02, LNCS 2232, 2002, pp. 299-320.*

S. Min "A Study on the Security of NTRU digital signature scheme," Master of Science Thesis, Information and Communications University, School of Engineering, Jan. 3, 2004.*

S. Min, et al. "Weak property of malleability in NTRUSign," ACISP04, 2004.*

J. Silverman, "An Introduction to the Theory of Lattices and Applications to Cryptography," Computational Number Theory and Applications to Cryptography, University of Wyoming, Jun. 19-Jul. 7, 2006, Retrieved: Oct. 10, 2012, Online: http://www.math.brown.edu/~jhs/Presentations/WyomingLattices.pdf.*

S. Min, "A Study on the Security of NTRU digital signature scheme," M.S. Thesis, Information and Communications University, School of Engineering, Jan. 3, 2004.*

English Translation of paragraphs [0013]-[0023] of Japanese Application No. 2006-053715, with Verification of Translation statement.

English Translation of paragraphs [0028]-[0030] of Japanese Application No. 2002-230202, with Verification of Translation statement.

English Translation of paragraphs [0052]-[0068] of Japanese Application No. 2007-288230, with Verification of Translation statement.

English Translation of paragraphs [0010]-[0016] of Japanese Application No. 2005-072917, with Verification of Translation statement.

International Search Report issued Mar. 31, 2009 in International (PCT) Application No. PCT/JP2009/000923.

Jeffrey Hoffstein et al., "NSS: An NTRU Lattice-Based Signature Scheme", Advances in Cryptoplogy Eurocrypt '01, LNCS, vol. 2045, pp. 211-228, Springer-Verlag, 2001.

Jeffrey Hoffstein et al., "NTRUSign: Digital Signatures Using the NTRU Lattice", CT-RSA'03, LNCS, vol. 2612, pp. 122-140, Springer-Verlag, 2003.

Efficient Embedded Security Standards (EESS) EESS #1 Implementation Aspects of NTRUEncrypt and NTRUSign, Version 2.0, Jun. 20, 2003.

Jeffrey Hoffstein et al., "NTRUSign: Digital Signatures Using the NTRU Lattice", [online], CT-RSA 2003, pp. 1-18, [retrieved on Mar. 19, 2009], Retrieved from the Internet:URL:http://www.ntru.com/cryptolab/intro_ntrusign.thm.

Jeffrey Hoffstein et al., "NTRUSign: Digital Signatures Using the NTRU Lattice Preliminary Draft 2—Apr. 2, 2002", [online], AsiaCrypt 2001, pp. 1-31, [retrieved on Mar. 19, 2009], Retrieved from the Internet:URL:http://www.ntru.com/cryptolab/intro_ntrusign.thm.

* cited by examiner

FIG. 3

| | | Distribution table | | | |
|---|---|---|---|---|---|
| V1_0_min | ... | V1_(N-1)_min | V2_0_min | ... | V2_(N-1)_min |
| V1_0_max | ... | V1_(N-1)_max | V2_0_max | ... | V2_(N-1)_max |
| 3 | ... | 2 | 1 | ... | 4 |
| 8 | ... | 5 | 6 | ... | 7 |

$V = (V1, V2)$
$V1 = (V1\_0, V1\_1, V1\_2, \ldots, V1\_(N\_1))$
$V2 = (V2\_0, V2\_1, V2\_2, \ldots, V2\_(N\_1))$

FIG. 5

Distribution table ~450

| | Probability of occurrence | V1_0_min V1_0_max | ... ... | V1_(N-1)_min V1_(N-1)_max | V2_0_min V2_0_max | ... ... | V2_(N-1)_min V2_(N-1)_max |
|---|---|---|---|---|---|---|---|
| A | 1/6 | 1 4 | ... ... | 2 5 | 1 6 | ... ... | 4 7 |
| B | 1/2 | 5 8 | ... ... | 4 7 | 2 4 | ... ... | 5 9 |
| C | 1/3 | 3 7 | ... ... | 8 10 | 5 8 | ... ... | 1 3 |

SIGNATURE AND VERIFICATION METHOD, SIGNATURE GENERATION DEVICE, AND SIGNATURE VERIFICATION DEVICE

TECHNICAL FIELD

The present invention relates to a cryptosystem as information security technology and in particular to digital signatures and their verification.

BACKGROUND ART

When data is transmitted from a transmission device to a reception device, a digital signature scheme, which is a type of public key cryptosystem, is used to identify the transmitter or to detect or prevent data tampering.

A digital signature scheme is a method wherein a transmission device generates signature data corresponding to data for transmission using a private key (secret key) belonging to the transmission device and transmits the signature data to the reception device along with the data for transmission. The reception device verifies the signature data and determines whether data tampering has occurred using the transmission device's public key. (See, for example, Non-Patent Literature 1). Since it is difficult to calculate the value of the private key from the public key, an unauthorized individual cannot pretend to be the transmission device and generate forged signature data.

In this sort of public key cryptosystem, it is preferable to combine relatively short, easily created keys with relatively fast encryption and decryption processes. Patent Literature 1 discloses a public key cryptosystem that allows keys to be chosen essentially at random from a large set of vectors, with key lengths comparable to the key lengths in other common public key cryptosystems, and that offers an appropriate security level.

NTRU (a registered trademark of NTRU Cryptosystems, Inc.) encryption has been proposed as a fast type of public key cryptosystem (see, for example, Non-Patent Literature 2). Unlike RSA encryption, which performs power-residue calculation with a certain modulus, or unlike elliptic curve cryptography, which performs scalar multiplication of a point on an elliptic curve, NTRU encryption performs encryption and decryption using polynomial, calculation that can be performed quickly. Therefore, NTRU encryption allows for faster processing than a conventional public key cryptosystem and for processing in a practical amount of time, even by software. Accordingly, an encrypted communication system that uses NTRU encryption for a public key cryptosystem has the benefit that processing by both the transmission device and the reception device can be performed faster than in an encrypted communication system that uses a conventional public key cryptosystem.

Note that NTRU encryption differs from RSA encryption or from elliptic curve cryptography not only in that processing can be performed quickly, but also in the computational complexity needed as a basis for security. RSA encryption uses the problem of prime factorization as the basis for security, whereas elliptic curve cryptography uses the discrete logarithm problem on an elliptic curve as the basis for security. NTRU encryption, on the other hand, relies on the shortest vector problem or the closest vector problem in a set of vectors in a lattice as the basis for security.

The NTRU encryption proposed above is a confidential encryption method to keep data confidential. Subsequently, a digital signature scheme using NTRU encryption has been proposed (see Non-Patent Literature 3). Due to factors such as the emergence of a method to crack this digital signature scheme, the scheme has been changed several times. The following is a simple description of the digital signature scheme called NTRUSign (for details, see Patent Literature 2 and Non-Patent Literature 4).

<NTRUSign Signature Scheme>
(1) System Parameters of NTRUSign Signature Scheme

In the NTRUSign Signature Scheme, non-negative integer parameters are N, q, df, dg, and Normbound. The meaning of these parameters is explained below.

(i) Parameter N

The NTRUSign signature scheme is a digital signature scheme that uses polynomial calculation to generate and verify signatures. Parameter N determines the degree of the polynomial used in the NTRUSign signature scheme.

With respect to parameter N, the polynomial used in the NTRUSign signature scheme is an integer coefficient polynomial of degree $N-1$ or less. When $N=5$, the polynomial is, for example, $X^4+X^3+1$. Note that in the present description, $X^{\wedge}a$ refers to X raised to the "a" power ($X^a$). Also, the public key h and signature s used in the NTRUSign signature scheme are both expressed as a polynomial of degree $N-1$ or less. The private key is a set of four polynomials (f,g,F,G) of degree $N-1$ or less. In other words, f, g, F, and G are each polynomials of degree $N-1$ or less. Note that, in the following, the set of four polynomials (f,g,F,G) are sometimes considered as two pairs (f,g) and (F,G) and expressed as {(f,g),(F,G)}.

Next, during polynomial calculation in the NTRUSign signature scheme, parameter N is substituted into the expression $X^{\wedge}N-1$ and calculated so that the result will always be a polynomial of degree $N-1$ or less. For example, if $N=5$, the product of the polynomials $X^4+X^2+1$ and $X^3+X$ is calculated to always be a polynomial of degree $N-1$ or less as shown below Note that in the following, "×" refers to the product of two polynomials, "·" refers to the product of an integer and a polynomial (or two integers), and $X^{\wedge}5=1$.

$$(X^{\wedge}4 + X^{\wedge}2 + 1) \times (X^{\wedge}3 + X) = X^{\wedge}7 + 2 \cdot X^{\wedge}5 + 2 \cdot X^{\wedge}3 + X$$
$$= X^{\wedge}2 \cdot 1 + 2 \cdot 1 + 2 \cdot X^{\wedge}3 + X$$
$$= 2 \cdot X^{\wedge}3 + X^{\wedge}2 + X + 2$$

Note that in the NTRUSign signature scheme, a polynomial of degree $N-1$ $a=a_0+a_1 \cdot X+a_2 \cdot X^2+\ldots+a_{(N-1)} \cdot X^{\wedge}(N-1)$ is equated with a vector $(a_0, a_1, a_2, \ldots a_{(N-1)})$ and expressed the same way. Here, $a_0, a_1, a_2, \ldots a_{(N-1)}$ are each integer coefficients of a polynomial "a".

(ii) Parameter q

The NTRUSign signature scheme uses a parameter q that is an integer 2 or greater. The coefficients of polynomials appearing in the NTRUSign signature scheme are calculated via a modulo q operation.

(ii) Parameters df, dg

The polynomial f and polynomial, g, which are pan of the private key used in the NTRUSign signature scheme, are determined respectively by parameters df and dg. Polynomial g is used along with polynomial f when generating polynomial h, the public key.

The polynomial f is selected so that, among N coefficients, df coefficients have a value of "1", and other coefficients have a value of "0". In other words, the polynomial f is a polynomial of degree $N-1$ or less and has N coefficients from, degree 0 (constant term) to degree $N-1$. Among these N coefficients, df coefficients have a value of "1", and (N−df) coefficients have a value of "0".

Similarly, the polynomial g is a polynomial of degree N−1 or less, and the polynomial f is selected so that, among N coefficients, df coefficients have a value of "1", and other coefficients have a value of "0".

(iv) Parameter Normbound

As described below, in the NTRUSign signature scheme, the distance between a "2·N dimensional vector generated from a signature s" and a "2·N dimensional vector that is a hash value for message data" is calculated to determine whether the signature is valid. Normbound is a threshold value used in this determination. In other words, if the calculated distance is less than Normbound (distance<Normbound), the signature is accepted as valid. Conversely, if the calculated distance is equal to or greater than Normbound (distance≧Normbound), the signature is rejected as invalid.

In Non-Patent Literature 4, (N,q,df,dg,Normbound)=(251, 128,73,71,310) is provided as an example of parameters in the NTRUSign signature scheme.

(2) Hash Value of Message Data, Norm, and Distance Between Vectors

In the NTRUSign signature scheme, a signature is generated for a hash value of message data. The hash value of the message data is a polynomial of degree N and is expressed as a 2·N dimensional vector. The hash function used to calculate the hash value from the message data is described in detail in Non-Patent Literature 1.

In the NTRUSign signature scheme, the distance between vectors is used for signature verification. Definitions are provided below.

The norm $\|a\|$ of the polynomial $a=a_0+a_1 \cdot X+a_2 \cdot X^2+ \ldots +a_{(N-1)} \cdot X^{(N-1)}$ is defined as follows.

$$\|a\|=\text{sqrt}((a_0-\mu)^2+ \ldots +(a_{(N-1)}-\mu)^2)$$

$$\mu=(1/N) \cdot (a_0+a_1+a_2+ \ldots +a_{(N-1)})$$

Note that sqrt(x) indicates the square root of x.

The norm $\|(a,b)\|$ of the pair (a,b) of polynomials a and b is defined as follows.

$$\|(a,b)\|=\text{sqrt}(\|a\|^2+\|b\|^2)$$

The distance between the pair (a,b) of polynomials a and b and the pair (c,d) of polynomials c and d is defined as $\|(c-a, d-b)\|$.

(3) Key Generation in NTRUSign Signature Scheme

In the NTRUSign signature scheme, as described above, polynomials f and g are generated randomly using the parameters df and dg. As described in Non-Patent Literature 4, a polynomial h is then generated using a polynomial Fq such that Fq×f=1(mod q), as in the following expression, $$h=Fq \times g \pmod{q}$$

Furthermore, polynomials F and G that satisfy the following equation and whose norm is small are calculated.

$$f \times G - g \times F = q$$

{(f,g),(F,G)} is the private key, and h is the public key. The private key is a key for generating a signature and is also referred to as a signature generation key. The public key is a key for verifying a signature and is also referred to as a signature verification key.

The following calculation is performed for x=y(mod q). Letting i=0, 1, 2, . . . , N−1, the $i^{th}$ coefficient of a polynomial y is divided by the modulus q and the remainder, which falls within a range from 0 to q−1, is calculated and used as the $i^{th}$ coefficient of the polynomial x. In other words, a mod q operation is calculated so that each coefficient of the polynomial y will be within a range of 0 to (q−1), and the resulting polynomial is treated as the polynomial x.

(4) Signature Generation in NTRUSign Signature Scheme

During signature generation in the NTRUSign signature scheme, a hash value vector is calculated for message data to be transmitted, and the closest lattice point is treated as the signature vector. By rounding off the coefficients in an Lsec coordinate system to integers, the closest lattice point can easily be obtained.

The following describes signature generation in the NTRUSign signature scheme in detail.

During signature generation in the NTRUSign signature scheme, as shown below, a signature s is calculated for message data m, the target of the signature.

First, a 2·N dimensional vector (m1,m2) (m1 and m2 are both N degree polynomials) is calculated as the hash value for the message data m.

Next, this 2·N dimensional vector (m1,m2) and the private key {(f,g),(F,G)} are used to calculate polynomials a, b, A, and B that satisfy the following equations.

$$G \times m1 - F \times m2 = A + q \times B$$

$$-g \times m1 + f \times m2 = a + q \times b$$

The coefficients "A" and "a" are the remainder after division by the modulus q, with the remainder adjusted to fall within a range of <−q/2>+1 to <q/2>. That is, when the remainder after division by the modulus q falls within a range of <q/2> to q−1, q is subtracted so that the remainder falls within the above range. <x> indicates the largest number equal to or less than x. For example, <−½>=−1.

Next, s and t are calculated via the following equation, and s is output as a signature, $$s = f \times B + F \times b \pmod{q}$$

$$t = g \times B + G \times b \pmod{q}$$

(5) Signature Verification in NTRUSign Signature Scheme

During signature verification in the NTRUSign signature scheme, as shown below, the signature s is verified as being valid or not for the message data m, which is the target of the signature.

First, a 2·N dimensional vector (m1,m2) is calculated as the hash value for the message data m.

Next, using the public key h, a polynomial t is calculated via the following equation.

$$t = s \times h \pmod{q}$$

Furthermore, the distance between the 2·N dimensional vector (s,t) and the 2·N dimensional vector (m1,m2) is calculated, and it is determined whether the distance is less than Normbound. If the distance is less than Normbound, the signature s is determined to be valid and is accepted. If the distance is equal to or greater than Normbound, the signature s is determined to be invalid and is rejected.

During signature verification in the NTRUSign signature scheme, a signature is thus determined to be valid if the signature vector is sufficiently close to a hash value vector.

<Lattice Problem as the Basis for Security>

In the NTRUSign signature scheme, the lattice problem serves as the basis for security, as described below.

In the NTRUSign Signature Scheme, the entire 2·N dimensional vector of $$(f \times \alpha, g \times \alpha) + (F \times \beta, G \times \beta),$$

which is obtained from the private key {(f,g),(F,G)}, is treated as a lattice (lattice Lsec). α, β are arbitrary polynomials, (f,g),(F,G) in the private key are referred to as bases (basis vectors) for the lattice. FIG. 20A shows the Lsec coordinate system when the entire 2·N dimensional vector is treated as a lattice (lattice Lsec).

The entire 2·N dimensional vector $$(1 \times \alpha', h \times \alpha') + (0, q \times \beta'),$$

which results when (1,h) (consisting of the public key h and "1") and (0,q) (consisting of "0" and q) are the bases, is also treated as a lattice (lattice Lpub). α', β' are arbitrary polynomials. FIG. 20B shows an Lpub coordinate system when the entire 2·N dimensional vector is treated as a lattice (lattice Lpub).

During signature verification, the distance between the 2·N dimensional vector (s,t) 822, which is the signature vector, and the 2·N dimensional vector (m1,m2) 821, which is the hash value vector obtained from the message data, is calculated, and it is determined whether the distance is less than Normbound. In other words, as shown in FIG. 20B, it is determined whether the 2·N dimensional vector (m1,m2) 821 exists within a hypersphere 823 that has a radius of Normbound and which is centered on the 2·N dimensional vector (s,t) 822, When the 2·N dimensional vector (m1,m2) 821 does exist within the hypersphere 823, signature verification is determined to be successful. When the 2·N dimensional vector (m1,m2) 821 does not exist within the hypersphere 823, signature verification is determined to have failed.

The lattice Lsec and the lattice Lpub both indicate the same set of vectors. However, the norm of the basis vectors (referred to as the private key basis vectors) composing the lattice Lsec is much smaller than the norm of the basis vectors (referred to as the public key basis vectors) composing the lattice Lpub. In general, it is difficult to seek basis vectors having a minimal norm from basis vectors having a large norm, which is referred to as the shortest basis vector problem. Accordingly, it is difficult to seek the private key basis vectors from the public key basis vectors. This difficulty serves as the basis for security for the key. Given this basis for security, it is thought to be difficult to acquire a public key from a private key.

As shown in FIG. 20A, during signature generation in the NTRUSign signature scheme, a vector for a lattice point that is close to the hash value vector 801H(m)=(m1,m2) for the message data (the closest lattice point) is treated as the signature vector 800(s,t), The closest lattice point vector is sought by projecting the hash value vector onto the basis formed by the private key basis 802(f,g) and the private key basis 803(F,G) to calculate the closest lattice point.

In the NTRUSign signature scheme, the signature vector (s,t) is thus the closest lattice point to the hash value vector (m1,m2) for the message data.

As shown in FIG. 20B, the norm of the basis vectors for the public key basis vector 812(1,h) and the public key basis vector 811 (0,q) in the Lpub coordinate system is large enough to make it difficult to calculate nearby vectors.

In general, the problem of calculating the closest lattice vector is referred to as the closest vector problem for lattices. The security of signatures in the NTRUSign signature scheme is based on this closest vector problem for lattices.

The GGH signature method is also known as another signature method whose basis for security for keys is the shortest basis vector problem for lattices, and whose basis for security for signatures is the closest vector problem for lattices, like tire NTRUSign signature scheme (see Non-Patent Literature 6).

CITATION LIST

[Patent Literature 1] Tokuhyo (Published Japanese translation of PCT international publication for patent application) No. 2000-516733, "Public Key Cryptosystem Method and Apparatus".

[Patent Literature 2] WO2003050998, "Signing and verifying digital document using NTRU or convolution modular lattice vector cryptographic system".

[Non-Patent Literature 1] Tatsuaki OKAMOTO and Hirosuke YAMAMOTO, "Gendai Angoka" (Modern Encryption), Sangyo Tosho, 1997.

[Non-Patent Literature 2] J. Hoffstein, J. Pipher, and J. H. Silverman, "NTRU: A ring based public key cryptosystem", Lecture Notes in Computer Science, 1423, pp. 267-288, Springer-Verlag, 1998.

[Non-Patent Literature 3] J. Hoffstein, J. Pipher and J. Silverman, "NSS: An NTRU Lattice-Based Signature Scheme," Advances in Cryptology-Eurocrypt '01, LNCS, Vol. 2045, pp. 211-228, Springer-Verlag, 2001.

[Non-Patent Literature 4] J. Hoffstein, N. Graham, J. Pipher, J. Silverman and W. Whyte, "NTRUSign: Digital Signatures Using the NTRU Lattice" CT-RSA'03, LNCS, Vol. 2612, pp. 122-340, Springer-Verlag, 2003.

[Non-Patent Literature 5] "Efficient Embedded Security Standards (HESS) EESS #1: Implementation Aspects of NTRUEncrypt and NTRUSign", Ver, 2.0, Jun. 20, 2003.

[Non-Patent Literature 6] O. Goldreich, S, Goldwasser and S. Halevi "Public-key cryptography from lattice reduction problems," in Proc. CRYPTO '97, LNCS, Vol. 1294, pp. 112-131, Springer-Verlag, 1997.

SUMMARY OF INVENTION

Technical Problem

Attacks known as "transcript attacks" are carried out against the above-described NTRUSign signature scheme. A transcript attack is an attack that seeks the private key from multiple signed documents (i.e. pairs of message data and signatures). The following is a simple description of a transcript attack (for details, see Non-Patent Literature 4).

For m1−s, i.e. the difference between multiple signatures s and m1, which is part of the hash value (m1,m2) for message data, $$m1 - s = e1 \times f + e2 \times F$$

(e1 and e2 being polynomials whose coefficients fall within a range of $-\frac{1}{2}$ to $\frac{1}{2}$). A transcript attack uses this fact to calculate a mean value of a second moment and fourth moment of the difference m1−s, thus seeking f,F, which is part of the private key.

The second moment a~2 of the polynomial a is the product a~2=a×a*, with a and the reciprocal of "a" defined as follows.

$$a: a = a_0 + a_1 \cdot X + a_2 \cdot X^2 + \ldots + a_{(N-2)} \cdot X^{(N-2)} + a_{(N-1)} \cdot X^{(N-1)}$$

the reciprocal of a, a*: a*=

$$a_0 + a_{(N-1)} \cdot X + a_{(N-2)} \cdot X^2 + \ldots + a_2 \cdot X^{(N-2)} + a_1 \cdot X^{(N-1)}$$

The fourth moment a~4 is a~2 raised to the second degree, i.e. a~4=a~2×a~2.

(the second moment of m1−2)=(e1×f+e2×F)×(e1*×f*+e2*×F*)=e1~×f~+e2~×F~+e1×f×e2*×F*+e2×F×e1*×f*

As the number of signed documents increases, e1~,e2~ which are included in the mean of the second moment of m1−s, converge on a fixed value, and e1×f×e2*×F* and e2×F×e1*×f* in the above equation approach zero. Accordingly, when the number of signed documents is large, the mean of the second moment of m1−s becomes nearly equal to k1×f~+k2×F~. Furthermore, with the mean of the fourth moment, it is similarly possible to acquire information on f and F and to seek f from the combination of such information.

According to Non-Patent Literature 4, the numbers of signed documents necessary to acquire information on the private key from the mean of the second moment and the fourth moment are 10^4 and 10^8 respectively. Therefore, for a transcript attack against the NTRUSign signature scheme to succeed, it is considered that 10^8 or more signed documents are necessary. Note that a transcript attack can similarly be carried out on another signature method (such as the GGH signature method) that uses the lattice problem as a basis for security.

In order to solve the above problem, it is an object of the present invention to provide a signature and verification method, signature generation device, signature verification device, signature generation method, and recording medium with a computer program for signature generation recorded thereon that can resist the above-described transcript attack.

Solution to Problem

In order to achieve the above object, one embodiment of the present invention is a method for generating and verifying a signature for target data having one of a shortest vector problem and an approximate shortest vector problem as a basis for security, in which a vector is a multi-dimensional representation of data divided into a plurality of pieces, the method comprising the steps of: acquiring the target data; converting the target data using a private disturbance vector smaller than a first size to generate a converted vector; generating a signature vector for the converted vector by seeking, in a lattice whose basis vectors are private key vectors, a lattice point closest to the converted vector and selecting a part of the signature vector as signature data; recovering the signature vector with public key vectors and the signature data, thus yielding a recovered signature vector, and verifying whether a distance between a vector representing the target data and the recovered signature vector is equal to or less than a second size that is larger than the first size; and outputting information indicating that verification is successful when the distance is equal to or less than the second size.

Advantageous Effects of Invention

This method has the advantageous effect that, even if an attacker carrying out a transcript attack collected and analyzed pairs of target data and signature data that are transmitted, the computational complexity would make it difficult to seek the private key used for signing, since the signature data is generated for a converted vector that is generated by converting the target data via a private disturbance vector smaller than a first size. Furthermore, signature data can be verified by determining whether the distance between a vector representing the target data and the signature vector is larger than the first size and equal to or less than the second size, verification being successful when the distance is equal to or less than the second size.

A transcript attack can therefore be prevented with this signature and verification method, which is a highly valuable effect.

BRIEF DESCRIPTION OF DRAWINGS

FIG. 3 shows a data structure of a distribution table 410.
FIG. 5 shows a data structure of a distribution table 450.
FIGS. 20A and 20B show a conventional NTRUSign signature scheme, wherein
FIG. 20A shows the Lsec coordinate system when the entire 2·N dimensional vector is treated as a lattice (lattice Lsec),
and FIG. 20B shows the Lpub coordinate system when the entire 2·N dimensional vector is treated as a lattice (lattice Lpub).

Figure 1:
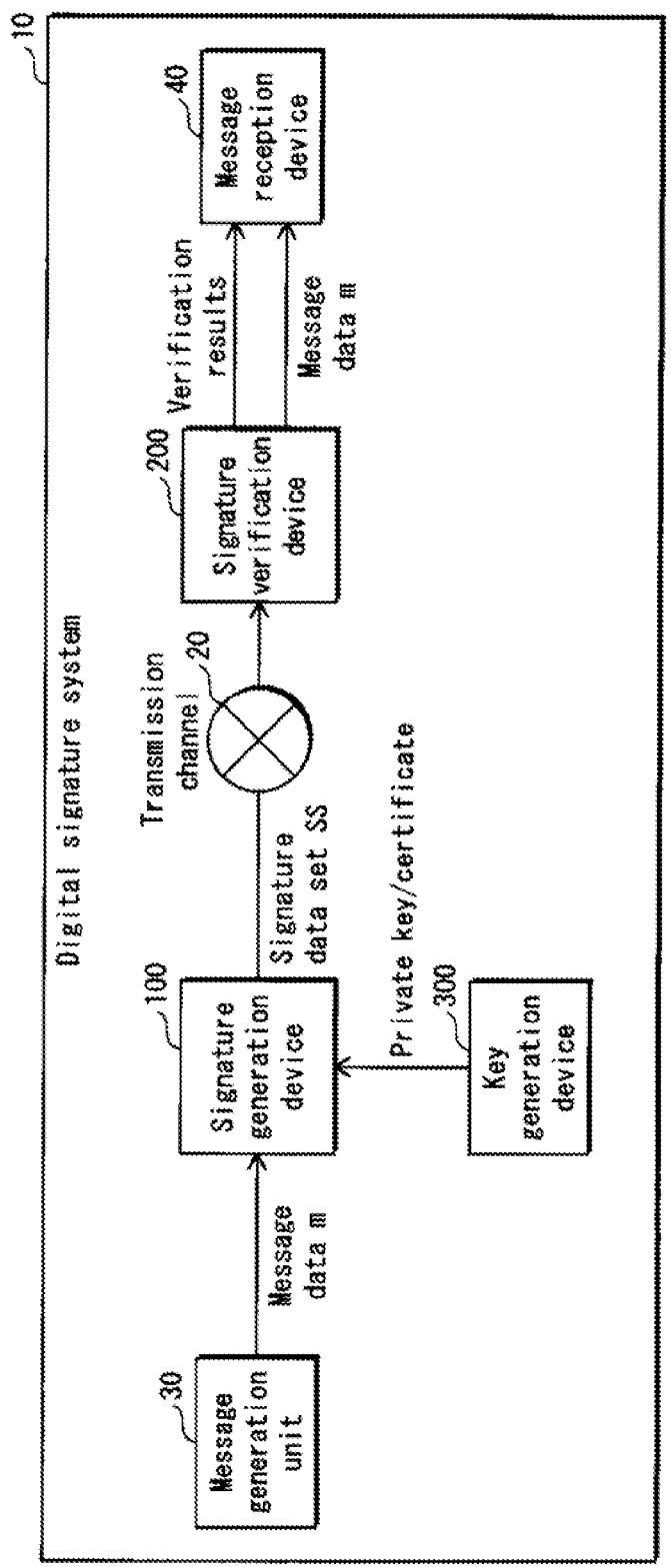
FIG. 1 is a block diagram showing a structure of a digital signature system 10 as one embodiment of the present invention.

| [Reference Signs List] | |
| --- | --- |
| 10 | digital signature system |
| 20 | transmission channel |
| 100 | signature generation device |
| 200 | signature verification device |
| 300 | key generation device |
| 101 | transmission unit |
| 102 | private key storage unit |
| 103 | public key certificate storage unit |
| 104 | signature generation unit |
| 105 | signature data set generation unit |
| 106 | system parameter storage unit |
| 111 | hash value calculation unit |
| 112 | vector generation unit |
| 113 | hash value conversion unit |
| 114 | signature generation unit |
| 115 | signature confirmation unit |
| 116 | vector group selection storage unit |
| 201 | reception unit |
| 202 | CA public key storage unit |
| 203 | signature data set storage unit |

-continued

[Reference Signs List]

| | |
|---|---|
| 204 | signature verification unit |
| 205 | system parameter storage unit |
| 211 | hash value calculation unit |
| 212 | signature vector generation unit |
| 213 | distance determination unit |
| 301 | distribution generation unit |
| 302 | key generation unit |
| 303 | certificate generation unit |
| 304 | certificate generation key storage unit |
| 305 | key setting unit |
| 306 | system parameter storage unit |

DESCRIPTION OF EMBODIMENTS

Claim 1 is a method for generating and verifying a signature for target data having one of a shortest vector problem and an approximate shortest vector problem as a basis for security, in which a vector is a multi-dimensional representation of data divided into a plurality of pieces, the method comprising the steps of: acquiring the target data; converting the target data using a private disturbance vector smaller than a first size to generate a converted vector; generating a signature vector for the converted vector by seeking, in a lattice whose basis vectors are private key vectors, a lattice point closest to the converted vector and selecting a part of the signature vector as signature data; recovering the signature vector with public key vectors and the signature data, thus yielding a recovered signature vector, and verifying whether a distance between a vector representing the target data and the recovered signature vector is equal to or less than a second size that is larger than the first size; and outputting information indicating that verification is successful when the distance is equal to or less than the second size.

Claim 2 is a signature generation device for generating signature data for target data having one of a shortest vector problem and an approximate shortest vector problem as a basis for security, in which a vector is a multi-dimensional representation of data divided into a plurality of pieces, the signature generation device comprising: an acquisition unit operable to acquire the target data; a private storage unit confidentially storing private key vectors; a data conversion unit operable convert the target data acquired by the acquisition unit using a private disturbance vector smaller than a first size to generate a converted vector; a signature generation unit operable to generate a signature vector for the converted vector by seeking, in a lattice whose basis vectors are private key vectors, a lattice point closest to the converted vector and to select a part of the signature vector as signature data; and an output unit operable to output die target data and the signature data.

This structure has the advantageous effect that, even if an attacker carrying out a transcript attack collected and analyzed pairs of target data and signature data that are transmitted, the computational complexity would make it difficult to seek the private key used for signing, since the signature data is generated for a converted vector that is generated by converting the target data via a private disturbance vector smaller than a first size.

Claim 3 is a signature generation device, wherein the private storage unit further stores a distribution indicating a range to which belongs a plurality of candidate vectors, each candidate vector having a size smaller than the first size, and from among the candidate vectors belonging to the range indicated by the distribution, the data conversion unit selects one candidate vector as the disturbance vector.

With this structure, during each signature generation, one candidate vector is selected from a plurality of candidate vectors as a disturbance vector. Therefore, the range of disturbance vectors that can be used broadens, making it even harder for an attacker to seek the private key.

Claim 4 is a signature generation device, wherein the private storage unit has tamper resistance, and the private key and the distribution are kept confidential, so as not to be divulged.

With this structure, the selected disturbance vector is kept private, making it difficult to seek the private key.

Claim 5 is a signature generation device, wherein in the range indicated by tire distribution stored by the private storage unit, a plurality of candidate vectors are arranged so as to be selected with a probability that is not uniform, and the data conversion unit selects one of the candidate vectors as the disturbance vector in accordance with the probability.

With this structure, during each signature generation, the range of disturbance vectors that can be used broadens, making it even harder for an attacker to seek the private key.

Claim 6 is a signature generation device, wherein the range indicated by the distribution includes a plurality of regions, a selection probability is pre-determined for each region, and a plurality of candidate vectors is arranged in each region, and the data conversion unit selects one region in accordance with the selection probabilities, thus yielding a selected region, and selects one candidate vector from among the candidate vectors within the selected region as the disturbance vector.

Claim 7 is a signature generation device, wherein the data conversion unit includes; a vector generation subunit that selects, from among the candidate vectors belonging to the range indicated by the distribution, one candidate vector as the disturbance vector, and an addition subunit that generates the converted vector by adding the disturbance vector to a vector that represents the target data.

Claim 8 is a signature generation device, wherein the vector generation subunit generates the disturbance vector by randomly selecting a candidate vector from among a plurality of candidate vectors pre-selected in accordance with the distribution.

Claim 9 is a signature generation device, wherein the distribution is included in a hypersphere having a radius of the first size.

Claim 10 is a signature generation device, further including a public storage unit storing a second size that is larger than the first size, wherein the data conversion unit is further operable to calculate a distance between a vector representing the target data and the converted vector and, when the distance is equal to or less than the second size, to convert the target data using a different private disturbance vector smaller than the first size, thus generating a different converted vector.

Claim 11 is a signature generation device, wherein the private key vectors are obtained from a set (f,g,F,G), each of which is an element of a ring R formed by an N dimensional array defined by addition, subtraction, multiplication, and a norm that indicates the size of elements, the set (f,g,F,G) being, for the ring R and a positive integer q, based on elements (f,g) of the ring R, on an element Fq which is the inverse of f(mod q), and on (F,G), which satisfies f×G−g×F=q, and the public key vectors are obtained from an element h, which is modulus q of a product of the element Fq and the element g for the positive integer q.

Claim 12 is a signature verification device for verifying signature data, the signature data being generated by a signature generation device that, having one of a shortest vector problem and an approximate shortest vector problem as a basis for security, in which a vector is a multi-dimensional representation of data divided into a plurality of pieces, converts target data into a converted vector using a private disturbance vector smaller than a first size and selects a part of a signature vector as the signature data, the signature vector being a lattice point closest to the converted vector in a lattice whose basis vectors are private key vectors, the signature verification device comprising; an acquisition unit operable to acquire the target data and the signature data; a storage unit storing public key vectors; a verification unit operable to recover the signature vector with the public key vectors and the signature data, thus yielding a recovered signature vector, and to verify whether a distance between a vector representing the target data and the recovered signature vector is equal to or less man a second size that is larger than the first size; and an output unit operable to output information indicating that verification is successful when the distance is equal to or less than the second size.

With this structure, signature data can be verified by determining whether the distance between a vector representing the target data and the signature vector is larger than the first size and equal to or less than the second size, verification being successful when the distance is equal to or less than the second size.

Claim 13 is a signature generation method used in a signature generation device for generating signature data for target data having one of a shortest vector problem and an approximate shortest vector problem as a basis for security, in which a vector is a multi-dimensional representation of data divided into a plurality of pieces, the signature generation method comprising the steps of: acquiring the target data; converting the target data acquired in the acquisition step using a private disturbance vector smaller than a first size to generate a converted vector; generating a signature vector for the converted vector by seeking, in a lattice whose basis vectors are private key vectors, a lattice point closest to the converted, vector and selecting a part of the signature vector as signature data; and outputting the target data and the signature data.

Claim 14 is a computer readable recording medium on which is recorded a computer program for signature generation used in a computer that generates signature data for target date having one of a shortest vector problem and an approximate shortest vector problem as a basis for security, in which a vector is a multi-dimensional representation of data divided into a plurality of pieces, the computer program causing the computer to perform the steps of: acquiring the target data; converting the target data acquired in the acquisition step using a private disturbance vector smaller than a first size to generate a converted vector; generating a signature vector for the converted vector by seeking, in a lattice whose basis vectors are private key vectors, a lattice point closest to the converted vector and selecting a part of the signature vector as signature data; and outputting the target data and the signature data.

Claim 15 is a system comprising a signature generation device for generating signature data and a signature verification device for verifying signature data, the devices having one of a shortest vector problem and an approximate shortest vector problem as a basis for security, in which a vector is a multi-dimensional representation of data divided into a plurality of pieces, the signature generation device comprising: an acquisition unit operable to acquire the target data; a private storage unit confidentially storing private key vectors; a data conversion unit operable convert the target data acquired by the acquisition unit using a private disturbance vector smaller than a first size to generate a converted vector; a signature generation, unit operable to generate a signature vector for the converted vector by seeking, in a lattice whose basis vectors are private key vectors, a lattice point closest to the converted vector and to select a part of the signature vector as signature data; and an output unit operable to output the target data and the signature data, and the signature verification device comprising: an acquisition unit operable to acquire the target data and the signature data; a storage unit storing public key vectors; a verification unit operable to recover the signature vector with the public key vectors and the signature data, thus yielding a recovered signature vector, and to verify whether a distance between a vector representing the target data and the recovered signature vector is equal to or less than a second size mat is larger than the first size; and an output unit operable to output information indicating that verification is successful, when the distance is equal to or less than the second size.

Embodiment 1

The following is a description, of a digital signature system 10 as an embodiment of the present invention.

As shown in FIG. 1, the digital signature system 10 is composed of a message generation device 30, a signature generation device 100, a signature verification device 200, a key generation device 300, and a message reception device 40. The signature generation device 100 and the signature verification device 200 are connected by a transmission channel 20, of which the internet is a representative example. The signature generation device 100 and the key generation device 300 transmit information to each other via another secure unit or by being connected via a secure transmission channel.

In the digital signature system 10, the message generation device 30 generates message data m for transmission (also referred to as data to be signed) and outputs the generated message data m to the signature generation device 100. Next, using the improved NTRUSign signature scheme, which is an improvement on the NTRUSign signature scheme, the key generation device 300 generates a key. The signature generation device 100 then generates signature data SD for message data m and transmits a signature data set SS that includes the message data m and the signature data SD to the signature verification device 200 via the transmission channel 20. The signature verification device 200 receives and verifies the signature data set SS and outputs the verification results and the message data m to the message reception device 40. The message reception device 40 receives the verification results and the message data m and, based on the received verification results, determines whether to accept the received message data m.

1. Improved NTRUSign Signature Scheme

The improved NTRUSign signature scheme uses the shortest vector problem or the approximate shortest vector problem as a basis for security. The shortest vector problem is the problem of seeking the "shortest vector" included in a lattice of a single basis vector. The approximate shortest vector problem is the problem of seeking the approximately shortest vector (i.e. a vector that is close in size to the shortest vector).

(1) System Parameters of Improved NTRUSign Signature Scheme

The improved NTRUSign signature scheme adds distances L and V to the non-negative integer parameters N, q, df, and dg in the conventional NTRUSign signature scheme. In the conventional NTRUSign signature scheme, Normbound is used during verification. On the other hand, in the improved NTRUSign signature scheme, as described below, during verification, the distance V is used instead of Normbound.

The following describes each of these parameters.

(i) Parameter N

The improved NTRUSign signature scheme is a digital signature scheme that uses polynomial calculation to generate and verify signatures. The degree of the polynomial in the improved NTRUSign signature scheme is determined by parameter N.

With respect to parameter N, the polynomial in the improved NTRUSign signature scheme is an Integer coefficient polynomial of degree N−1 or less. For example, when N=5, the polynomial is $X^4+X^3+1$.

The public key h and signature s are both expressed as polynomials of degree N−1 or less. The private key is a set of four polynomials (f,g,F,G) of degree N−1 or less. In other words, f, g, F, and G are each polynomials of degree N−1 or less. Note that, in the following, the set of four polynomials (f,g,F,G) are sometimes considered as two pairs (f,g) and (F,G) and expressed as {(f,g),(F,G)}.

The vectors that are the private key are thus obtained from the set (f,g,F,G), each of which is an element of a ring R formed by an N dimensional array defined by addition, subtraction, multiplication, and a norm that indicates the size of the elements. For the ring R and a positive integer q, the set (f,g,F,G) is based on elements (f,g) of the ring R, on an element Fq which is the inverse of f(mod q), and on (F,G), which satisfies f×G−g×F=q. The vectors that are the public key are obtained from the element h, which is congruent modulo q with a product of the element Fq and the element g for the positive integer q.

Furthermore, during polynomial calculation in the improved NTRUSign signature scheme, parameter N is substituted into the expression $X^N-1$ and calculated so that the result will always be a polynomial of degree N−1 or less.

Note that in the improved NTRUSign signature scheme, a polynomial of degree N−1 $a=a_0+a_1 \cdot X+a_2 \cdot X^2+ \ldots +a_{(N-1)} \cdot X^{(N-1)}$ is equated with a vector $(a_0, a_1, a_2, \ldots, a_{(N-1)})$ and expressed the same way. $a_0, a_1, a_2, \ldots, a_{(N-1)}$ are each integer coefficients of the terms in polynomial a.

(ii) Parameter q

The improved NTRUSign signature scheme uses a parameter q that is an integer two or greater. The coefficients of polynomials appearing in the improved NTRUSign signature scheme are calculated via a modulo q operation.

(iii) Parameters df, dg

The polynomial f and polynomial g, which are part of the private key used in the improved NTRUSign signature scheme, are determined respectively by parameters df and dg. Polynomial g is used along with polynomial f when generating polynomial h, the public key.

The polynomial f is selected so that, among N coefficients, df coefficients halve a value of "1", and other coefficients have a value of "0". In other words, the polynomial f is a polynomial of degree N−1 or less, with one coefficient for each of N terms from degree 0 (constant term) to degree N−1, for a total of N coefficients. The polynomial f is selected so that, among these N coefficients, df coefficients have a value of "1", and (N−df) coefficients have a value of "0".

Similarly, the polynomial g is selected so that dg coefficients are "1", and the other coefficients are "0".

(iv) Parameter L (distance)

Parameter L (also called the first size) is the radius of a hypersphere in 2·N dimensional vector space. The following is a description of the relationship between selection of a random vector for addition, the hypersphere, and a distribution η in the improved NTRUSign signature scheme.

In the improved NTRUSign signature scheme, as described below, a random vector (also referred to as a disturbance vector) is added to a 2·N dimensional vector (also called a hash value vector) for a hash value of message data in order to generate a converted hash value vector.

The distribution η is set to be included within a hypersphere of radius L, and the random vector is selected randomly with equal probability from a plurality of vectors (also referred to as candidate vectors) existing within the distribution η. Accordingly, the norm of the selected vector is equal to or less than 1.

Figure 2:
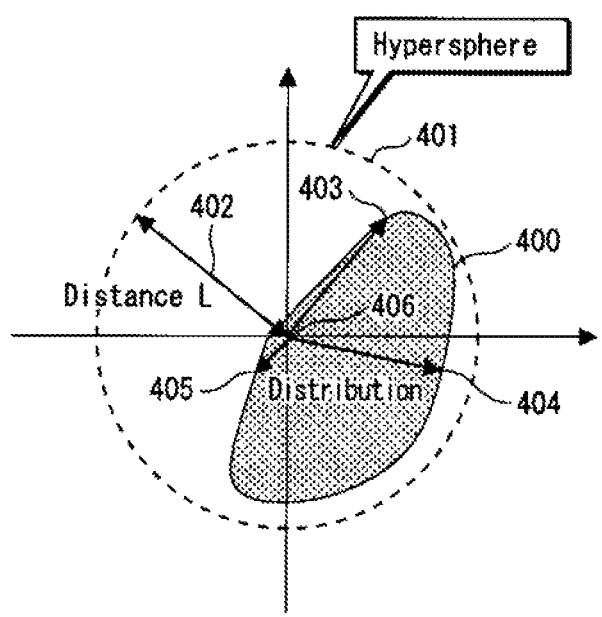
FIG. 2 shows an example of a uniform distribution.

FIG. 2 shows an example of the distribution η. FIG. 2 schematically expresses the 2·N dimensional vector space on two-dimensional paper and shows a hypersphere 401 having a center 406 and a radius L (distance 402). A distribution 400 exists within the hypersphere 401. The distribution 400 is completely included within the hypersphere 401. Vector 403, for example, is selected randomly from, among a plurality of vectors existing within the distribution 400. Note that the vector 404 may be selected, as may the vector 405.

The distribution table 410 in FIG. 3 shows the data configuration of the distribution 400.

The distribution table 410 defines the structure of the space occupied by the distribution 400 in the 2·N dimensional vector space and includes 2·N pairs of threshold limit values. The 2·N pairs of threshold limit values correspond to 2·N elements in the 2·N dimensional vector. The 2·N pairs of threshold limit values are composed of a first group and a second group. The first group includes N pairs of threshold limit values, and the second group includes the remaining N pairs of threshold limit values. The pairs of threshold limit values each include a lower limit and an upper limit.

The space that the distribution 400 occupies in the 2·N dimensional vector space is the space that is equal to or greater than the lower limit and equal to or less than the upper limit included in each pair of threshold limit values for n·N elements in the 2·N dimensional vector. Each pair of threshold limit values is set so that this space is included within the hypersphere 401.

The lower limit V1_0_min 411 and the upper limit V1_0_max 412 of the $0^{th}$ pair of threshold limit values included in the first group of the distribution table 410 are respectively, for example, "3" and "8", The lower limit V1_(N−1)_min 413 and the upper limit V1_(N−1)_max 414 of the N−$1^{th}$ pair of threshold limit values included in the first group are respectively, for example, "2" and "5". The lower limit Vn_0_min 415 and the upper limit V2_0_max 416 of the $0^{th}$ pair of threshold limit values included in the second group of the distribution table 410 are respectively, for example, "1" and "6". The lower limit V2_(N−1)_min 417 and the upper limit V2_(N−1)_max 418 of the N−$1^{th}$ pair of threshold limit values included in the second group are respectively, for example, "4" and "7".

Using the 2·N pairs of threshold limit values in the distribution table 410, a value that is equal to or greater than the lower limit and equal to or less than the upper limit included in each pair of threshold limit values is randomly selected with even probability, i.e. uniformly. 2·N random values $V1_0, V1_1, V1_2, \ldots V1_{(N-1)}, V2_0, V2_1, V2_2, \ldots, V2_{(N-1)}$ are thus selected, and the set of 2·N randomly selected values are set as the randomly selected vector V=(V1,V2).

In this case, $V1=(V1_0, V1_1, V1_2, \ldots, V1_{(N-1)})$ $$V2=(V2_0, V2_1, V2_2, \ldots, V2_{(N-1)})$$

FIG. 2 thus shows selection of a vector extending from the origin to any point within the distribution range. In this example distribution, vectors are randomly selected within the distribution range in a uniform manner (i.e. with equal probability).

Parameter L is disclosed as a system parameter. For example, parameter L may equal 200.

Figure 4:
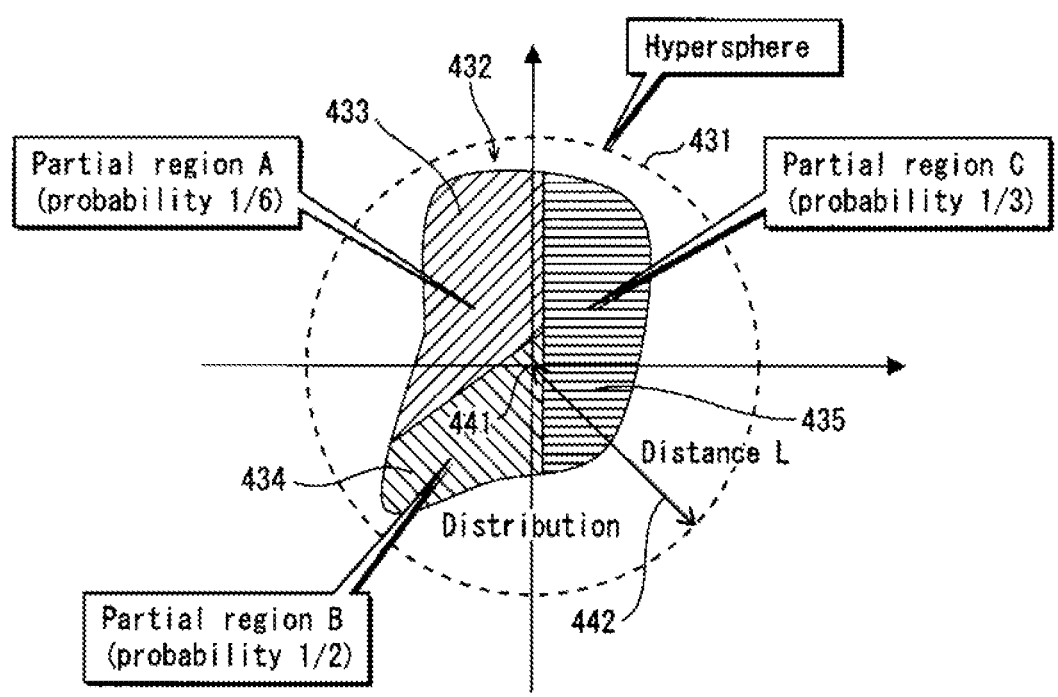
FIG. 4 shows an example of a non-uniform distribution.

Next, FIG. 4 shows another example of the distribution η. Like FIG. 2, FIG. 4 schematically expresses the 2·N dimensional vector space on two-dimensional paper and shows a hypersphere 431 having a center 441 and a radius L (distance 442). A distribution 432 exists within the hypersphere 431. The distribution 432 is completely included within the hypersphere 431.

The distribution 432, as shown in FIG. 4, is divided into three regions: a partial region A(433), partial region B(434), and partial region C(435). Each partial region has a set probability of being selected. The probability of selecting partial region A(433) is ⅙, the probability of selecting partial region B(434) is ½, and the probability of selecting partial region C(435) is ⅓. When this distribution 432 is used, one of partial region A(433), partial region R(434), and partial region C(435) is first selected based on these probabilities, and subsequently a vector is selected randomly from among candidate vectors within the selected partial region. Note that the sum of these probabilities is 1.

$$⅙+½+⅓=1$$

Distribution 432 is thus arranged so that a plurality of candidate vectors will not be selected with uniform probability.

The distribution table 450 in FIG. 5 shows the data configuration of the distribution 432.

The distribution table 450 defines the structure of the space occupied by the distribution 432 in the 2·N dimensional vector space and includes a plurality of pairs of a partial table and a probability of occurrence. Specifically, the distribution table 450 includes the following pairs: a partial table 451 and a probability of occurrence 454, a partial table 452 and a probability of occurrence 455, and a partial table 453 and a probability of occurrence 456. The three partial tables 451, 452, and 453 respectively correspond to the partial region A(433), partial region B(434), and the partial region C(435) in FIG. 4. The probability of occurrence corresponding to each partial table is the probability of selecting the partial region shown in the distribution 432 in FIG. 4. Each partial table unit has the same structure as the distribution table 410 shown in FIG. 3, and each contains 2·N pairs of threshold limit values.

Depending on the three probabilities of occurrence 454, 455, and 456 included in the distribution table 450, one partial table is selected, and a vector is selected at random within the range shown by the selected partial table.

(v) Parameter L' (distance)

In the improved NTRUSign signature scheme, as described below, the distance between a 2·N dimensional vector (called a signature vector) generated from the signature s and a hash value vector is calculated. The signature s is determined to be authorized or not based on this distance. Parameter L' (second size) is a threshold value used during this determination. In other words, if the calculated distance is equal to or less than L', the signature is accepted as valid. If the distance is larger than L', the signature is rejected as invalid.

In Non-Patent Literature 4, (N,q,df,dg)=(251,128,73,71) is provided as an example of parameters in the conventional NTRUSign signature scheme.

The same example parameters may be used in the improved NTRUSign signature scheme. In the improved NTRUSign signature scheme, adjustments are made so that when a vector is selected within the hypersphere of distance L, the distance between the hash value vector and a properly generated signature vector becomes nearly L'.

For example, the parameters L and L' may respectively be 200 and 500. In the example parameters in the conventional NTRUSign signature scheme, Normbound is 300 to 310, in which case the distance between the hash value vector and a properly generated signature vector is almost always equal to or less than Normbound.

In the improved NTRUSign signature scheme, on the other hand, the distance between a convened hash value vector and a signature vector is almost always equal to or less than Normbound. The difference between the converted hash value vector and the hash value vector is a random vector, and since the distance thereof is equal to or less than L, L' can be set to Normbound+L. Accordingly, if L is set to 200, V should be set between 500 and 510. V is thus larger than L.

(2) Hash Value of Message Data, Norm, and Distance Between Vectors

In the improved NTRUSign signature scheme, a signature is generated for a hash value of message data. The hash value of the message data is a polynomial of degree N and is treated as a 2·N dimensional vector. The hash function is described in detail in Non-Patent Literature 1.

As one example, a 3514 bit (3514 bits=1757 bits×2=7 bits×251×2) hash value is generated from message data m. In this case, N is 251. The generated 3514 bit hash value is divided seven bits at a time from the top, forming 251×2=502 bit sequences. These 502 bit sequences are the coefficients for a pair of N(=251) dimensional polynomials.

Letting the 3514 bit hash value be (Bit1-1,Bit1-2, Bit1-3, . . . , Bit1-251), (Bit2-1,Bit2-2,Bit2-3, . . . , Bit2-251) and letting the 2·N dimensional vector H, which is a hash value for message data m, be (m1,m2) (m1 and m2 are N-dimensional polynomials), then the coefficients of the N-dimensional polynomial m1 are (Bit1-1,Bit1-2,Bit3-3, . . . Bit1-251) and the coefficients of the N-dimensional polynomial m2 are (Bit2-1,Bit2-2,Bit2-3, . . . , Bit2-251). In this case, Biti-j (i=1,2 and j=1, 2, 3, . . . , 251) is seven bits long.

In the improved NTRUSign signature scheme, the same distance between vectors is used as in the conventional NTRUSign signature scheme. Definitions are provided below.

The norm $\|a\|$ of the polynomial $a=a_0+a_1 \cdot X+a_2 \cdot X^2+ \ldots a_{(N-1)} \cdot X^{(N-1)}$ is defined as follows.

$$\|a\|=\text{sqrt}((a_0-\mu)^2+ \ldots +(a_{(N-1)}-\mu)^2)$$

$$\mu=(1/N) \cdot (a_0+a_1+a_2+ \ldots +a_{(N-1)})$$

Note that sqrt(x) indicates the square root of x.

The norm $\|(a,b)\|$ of the pair (a,b) of polynomials a and b is defined as follows.

$$\|(a,b)\|=\text{sqrt}(\|a\|^2+\|b\|^2)$$

The distance between the pair (a,b) of polynomials a and b and the pair (c,d) of polynomials c and d is defined as $\|(c-a, d-b)\|$.

(3) Key Generation in Improved NTRUSign Signature Scheme

In the improved NTRUSign signature scheme, as described above, polynomials f and g are generated randomly using the parameters df and dg. As described in Non-Patent Literature 4, a polynomial h is then generated using a polynomial Fq such that Fq×f=1 (mod q), as in the following expression.

$$h=Fq \times g \pmod{q}$$

Furthermore, polynomials F and G that satisfy the following equation and whose norm is small are calculated.

$$f \times G - g \times F = q$$

x=y(mod q) is a calculation in which the $i^{th}$ coefficient of a polynomial y (0≦i≦N−1) is divided by the modulus q and the remainder, which falls within a range from 0 to q−1, is used as the $i^{th}$ coefficient of the polynomial x. In other words, a mod q operation is calculated so that each coefficient of y will be within a range of 0 to (q−1), and the resulting polynomial is treated as the polynomial x.

Furthermore, the distribution η is arbitrarily set so as to be included in a hypersphere with a distance L. The information used for this setting is the range of tire distribution and the probability of selection within the range of distribution. For example, a distribution is set as in FIG. 2 or FIG. 4.

The private key is set to {(f,g),(F,G)} and distribution η, and the public key is set to h. The private key is a key for generating a signature and is also referred to as a signature generation key. The public key is a key for verifying a signature and is also referred to as a signature verification key.

Since the distribution η is included in the private key, it is naturally kept private. Note that all of the distribution η may be kept private, but for example, while keeping the range of the distribution 400 shown in FIG. 2 private, it may be disclosed that vectors are randomly and uniformly selected based on the distribution 400. Also, in the distribution 432 shown in FIG. 4, both the range of the distribution 432 and the probability of selection in each partial region may be kept private, or the range of the distribution 432 may be disclosed while keeping the probability of selection in each partial region private.

(4) Signature Generation in Improved NTRUSign Signature Scheme

Figure 6:
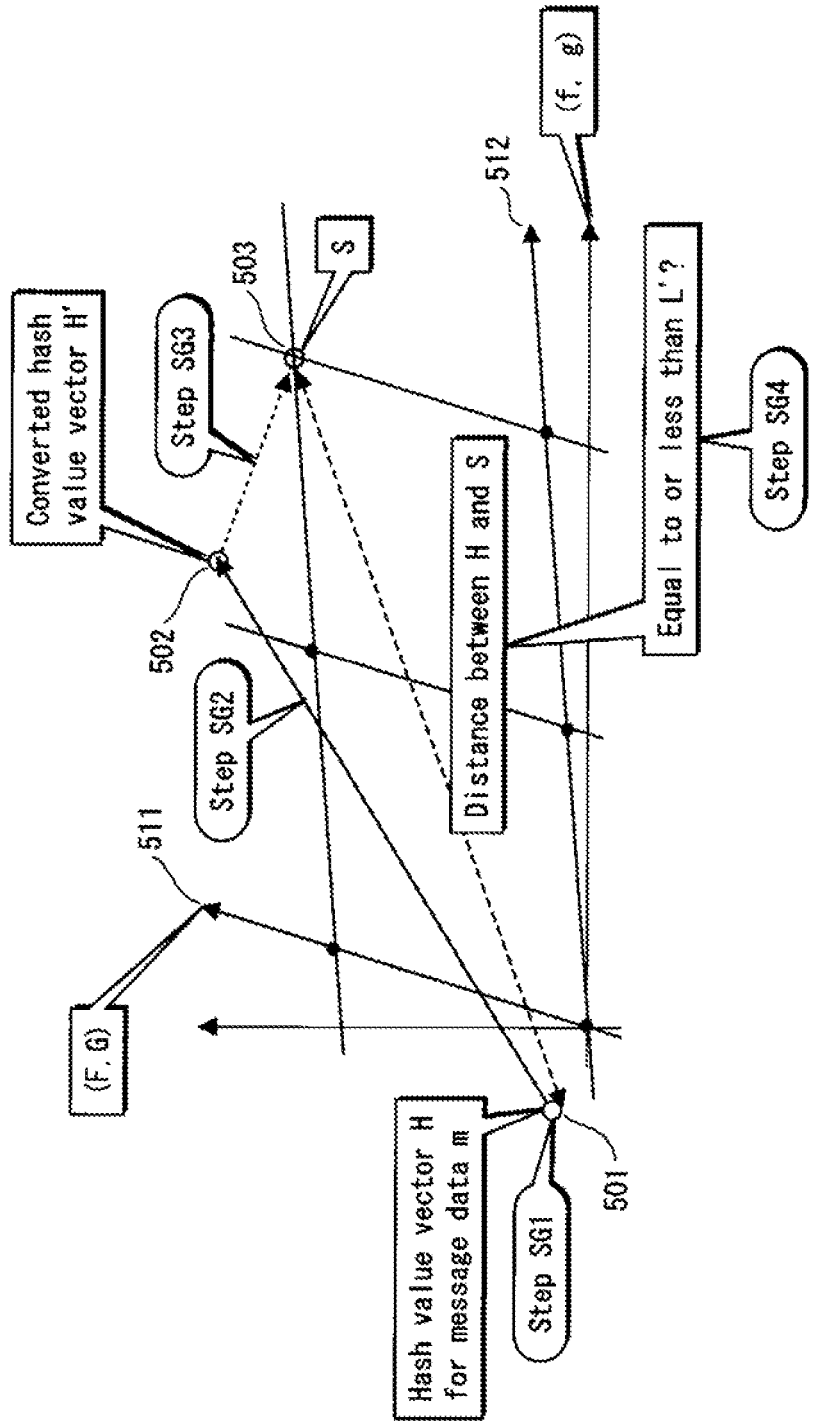
FIG. 6 shows signature generation in an improved NTRUSign signature scheme.

Signature generation in the Improved NTRUSign signature scheme is described with reference to FIGS. 6 and 17.

During signature generation in the improved NTRUSign signature scheme, a signature s is calculated for message data m, the target of the signature. FIG. 6 shows the process of signature generation and shows an Lsec coordinate system when the entire 2·N dimensional vector is treated as a lattice (lattice Lsec). FIG. 17 is a flowchart showing the process of signature generation.

First, a 2·N dimensional vector H=(m1,m2) (m1 and m2 are both N degree polynomials) is calculated as the hash value for the message data m (step SG1). Hereinafter, H is referred to as a hash value vector. In FIG. 6, the hash value vector H is shown as reference number 501.

Next, a vector V is randomly selected within the distribution range, and a converted hash value vector H'=H+V is calculated (step SG2). m1', m2' are polynomials satisfying H=(m1',m2'). In FIG. 6, the converted hash value vector H' is shown as reference number 502.

Using the same method as the conventional NTRUSign signature scheme, the vector S=(s,t) for the closest lattice point to the converted hash value vector H' is calculated (step SG3). In FIG. 6, the vector S is shown as reference number 503.

Next, this 2·N dimensional vector (m1',m2') and the private key {(f,g),(RG)} are used to calculate polynomials a, b, A, and B that satisfy the following equations.

$$G \times m1' - F \times m2' = A + q \times B$$

$$-g \times m1' + f \times m2' = a + q \times b$$

The coefficients "A" and "a" are the remainder after division by the modulus q, with the remainder adjusted to fall within a range of <−q/2>+1 to <q/2>. That is, when the remainder after division by the modulus q falls within a range of <q/2> to q−1, q is subtracted so that the remainder falls within the above range. <x> indicates the largest number equal to or less than x. For example, <−½>−1.

Next, s and t are calculated via the following equation.

$$s = f \times B + F \times b \pmod{q}$$

$$t = g \times B + G \times b \pmod{q}$$

Next, the distance between the hash value vector H and S is calculated, it is then determined whether the distance between H and S is equal to or less than L' or not (step SG4). If the distance is equal to or less than L' (step SG4: YES), then s is treated as the signature (step SG5). If the distance is not equal to or less than L' (step SG4: NO), then the process is repeated from step SG2.

If L and L' are set as above to 200 and 500 respectively, then in step SG4, the distance between the hash value vector H and S is almost always equal to or less than L', and thus returning to step SG2 is rare.

(5) Signature Verification in Improved NTRUSign Signature Scheme

Signature verification in the improved NTRUSign signature scheme is described with reference to FIGS. 7 and 18.

During signature verification in the improved NTRUSign signature scheme, it is verified whether a signature s is valid for message data m, the target of the signature. FIG. 7 shows the process of signature verification and shows an Lpub coordinate system when the entire 2·N dimensional vector is treated as a lattice (lattice Lpub). FIG. 18 is a flowchart showing the process of signature generation.

First, a 2·N dimensional vector H=(m1,m2) is calculated as the hash value for the message data m (step SV1). In FIG. 7, the vector H is shown as reference number 531.

Next, using the public key h, a polynomial t is calculated via the following equation to recover the signature vector S=(s,t) (step SV2). In FIG. 7, the signature vector S is shown as reference number 532.

$$t = s \cdot h \pmod{q}$$

The distance between H and S is calculated, and it is determined whether the calculated distance is equal to or less than L' (step SV3). If the distance Is equal to or less than L' (step SV3; YES), then the signature s is accepted as valid, and the result "OK" is output (step SV4). If the distance is larger than L' (step SV3: NO), then the signature s is rejected as invalid, and the result "NG" is output (step SV5).

2. Structure of Each Device (1) Structure of Signature Generation Device 100

Figure 8:
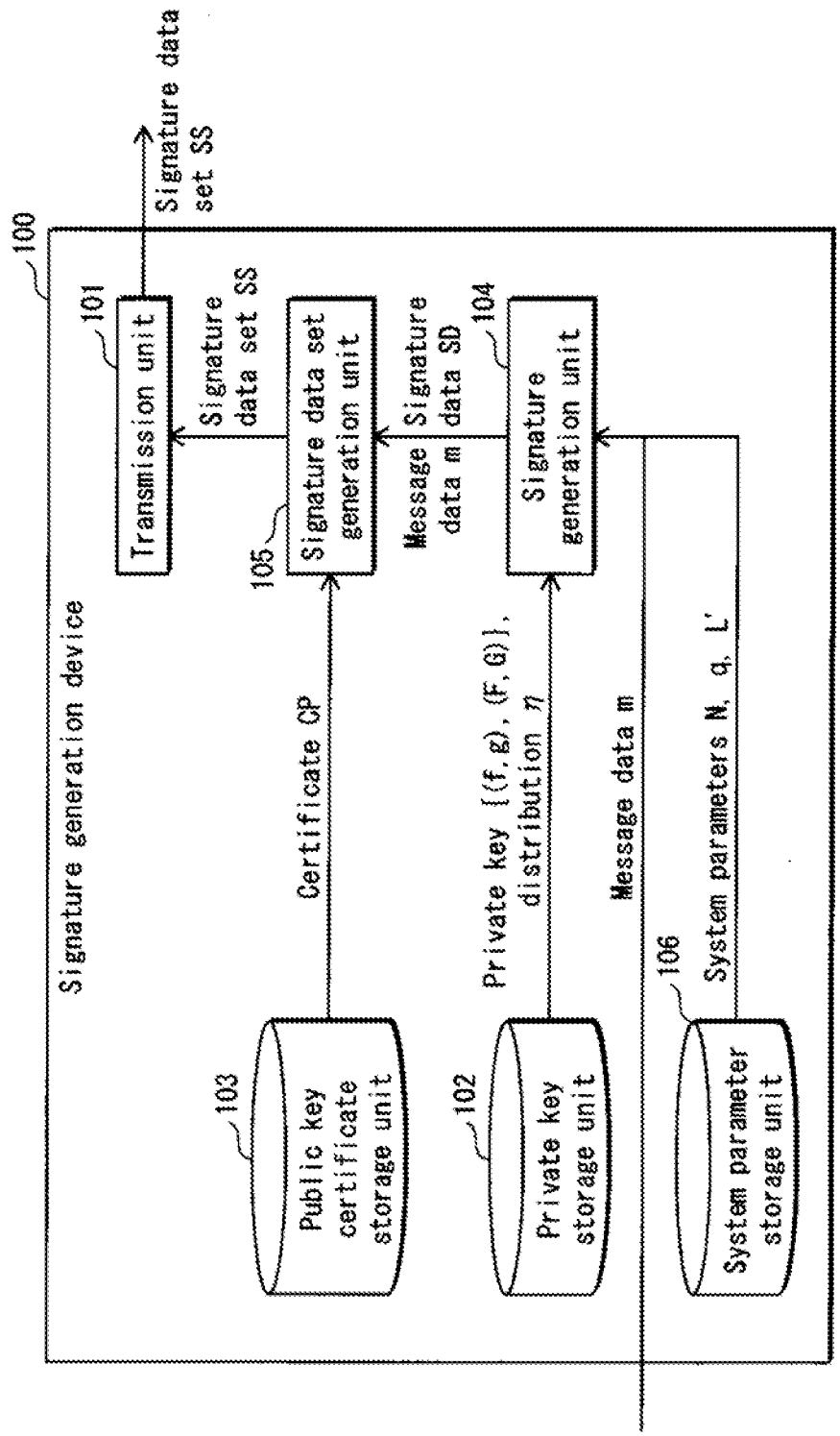
FIG. 8 is a block diagram showing a structure of a signature generation device 100.

The signature generation device 100 generates a signature data set SS for message data m to be transmitted to a recipient. As shown in FIG. 8, the signature generation device 100 comprises a transmission unit 101, private key storage unit 102, public key certificate storage unit 103, signature generation unit 104, signature data set generation unit 105, and system parameter storage unit 106.

Figure 9:
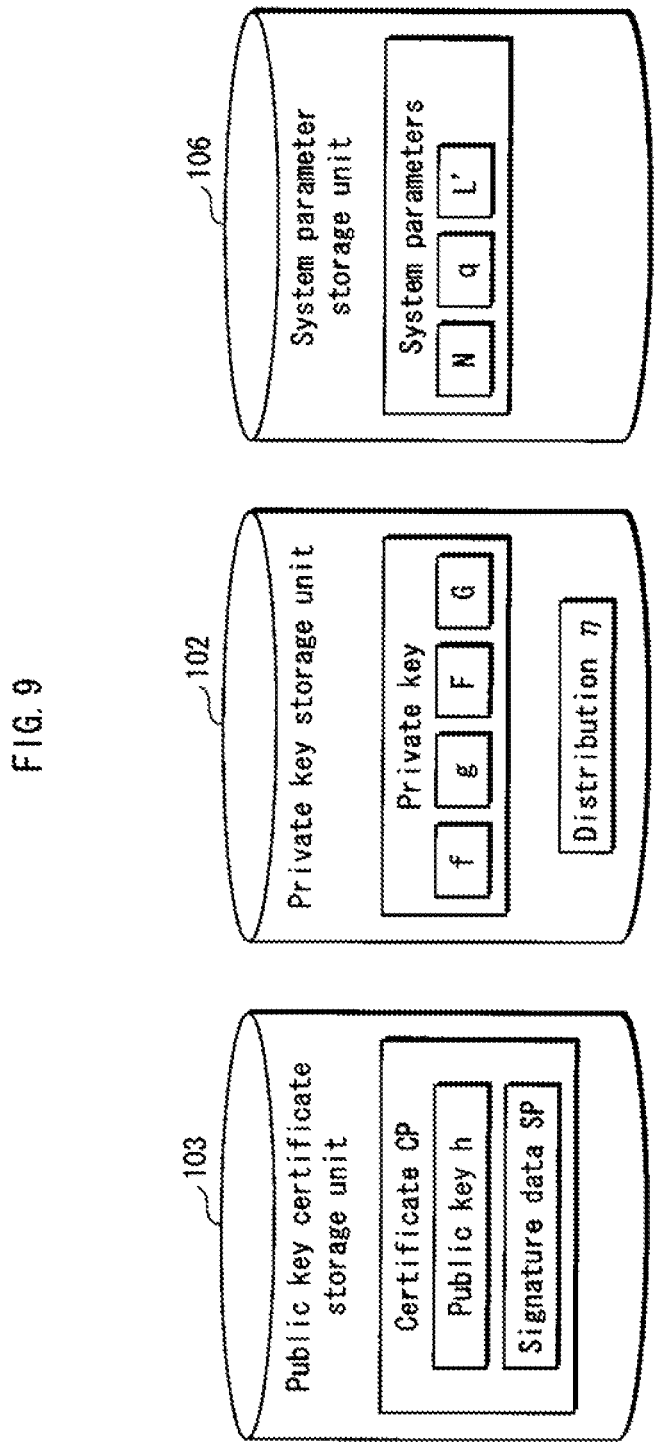
FIG. 9 shows data recorded in a public key certificate storage unit 103, a private key storage unit 102, and a system parameter storage unit 106, which are included in the signature generation device 100.

The private key storage unit 102 is tamper resistant, and as shown in FIG. 9, pre-stores {(f,g),(F,G)} and distribution η as the private key. The private key and distribution are kept private so as not to be divulged.

As shown in FIG. 9, the system parameter storage unit 106 stores, as pre-set system parameters, the parameter N, parameter q, and parameter L' (distance).

As shown in FIG. 9, the public key certificate storage unit 103 pre-stores a certificate CP of the public key h. The certificate CP is composed of the public key h and signature data SP from the key generation device 300 for the public key h. The signature data SP is generated using the improved NTRUSign signature scheme. The certificate CP is also provided beforehand. Note that in addition to the public key h and the signature data SP, the certificate CP may include, for example, data such as a user identifier, a time limit for the certificate, etc.

As described above, in accordance with the improved NTRUSign signature scheme, the signature generation unit 104 generates the signature data SD for message data m using the private key $\{(f,g),(F,G)\}$ and distribution η stored in the private key storage unit 102.

The signature data set generation unit 105 receives the certificate CP from the public key certificate storage unit 103, receives signature data SD from the signature generation unit 104, and generates a signature data set SS composed of the message data m, certificate CP, and signature data SD.

The transmission unit 101 transmits the signature data set SS thus generated to the signature verification device 200 via a transmission channel 20.

(Structure of the Signature Generation Unit 104)

Figure 10:
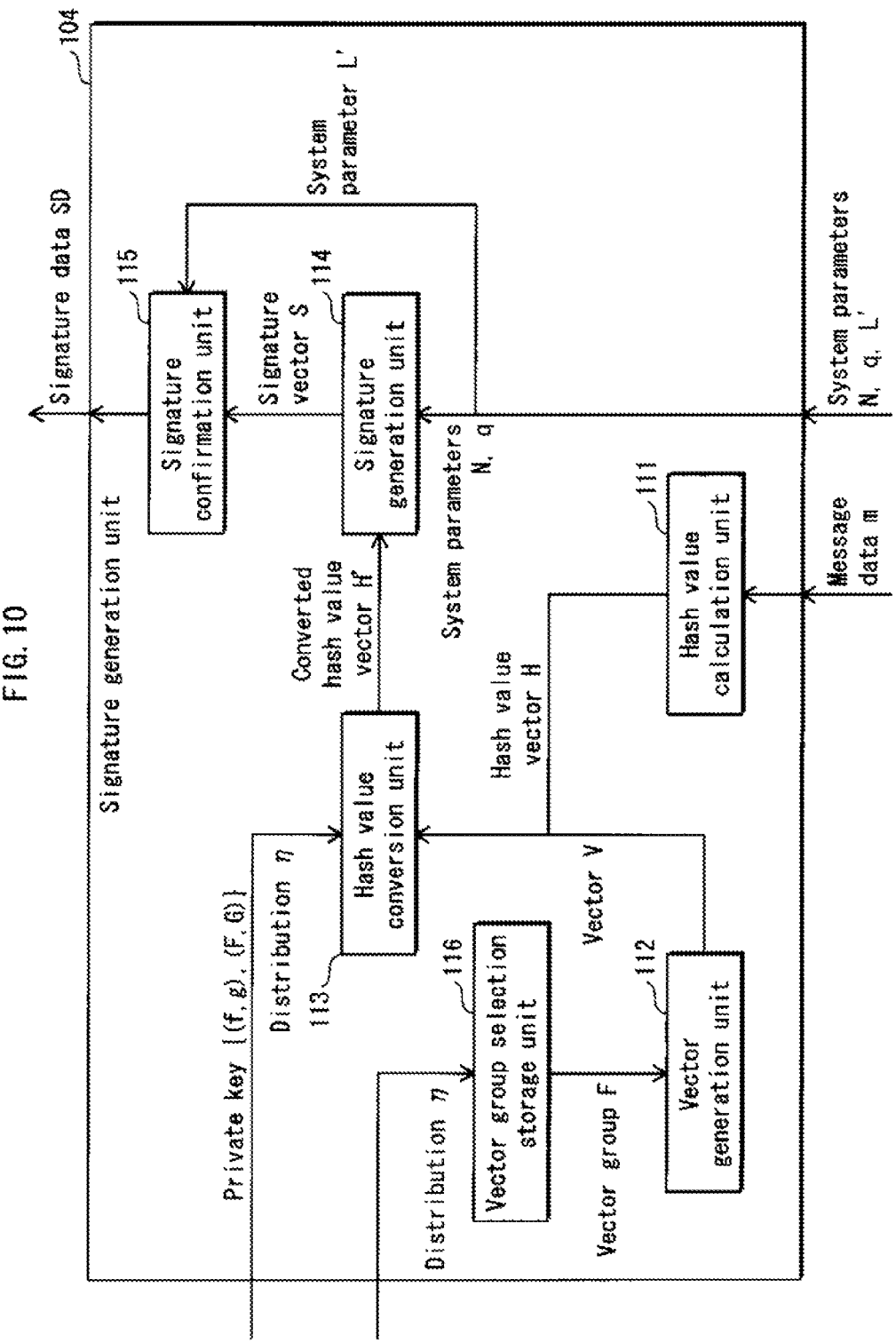
FIG. 10 is a block diagram showing a structure of a signature generation unit 104.

As shown in FIG. 10, the signature generation unit 104 is composed of a hash value calculation unit 111, vector generation unit 112, hash value conversion unit 113, signature generation unit 114, signature confirmation unit 115, and vector group selection storage unit 116.

The hash value calculation unit 111 performs step SG1 during signature generation in the improved NTRUSign signature scheme to calculate a hash value vector H for message data m.

The vector generation unit 132 generates the vector V used in step SG2 for signature generation in the improved NTRUSign signature scheme.

The hash value conversion unit 113 generates a converted hash value vector H'=H+V using the vector V generated by the vector generation unit 112 to perform step SG2 for signature generation in the improved NTRUSign signature scheme.

The signature generation unit 114 performs step SG3 for signature generation in the improved NTRUSign signature scheme, thus generating a signature vector S=(s,t).

The signature confirmation unit 115 performs step SG4 for signature generation in the improved NTRUSign signature scheme, thus confirming the signature vector. If the results of confirmation indicate that the hash value vector and the signature vector are not equal to or less than distance L', processing begins again with the vector generation unit 112. If the hash value vector and the signature vector are equal to or less than the distance L', s in the signature vector S=(s,t) is set as the signature data SD.

(2) Structure of Signature Verification Device 200

Figure 11:
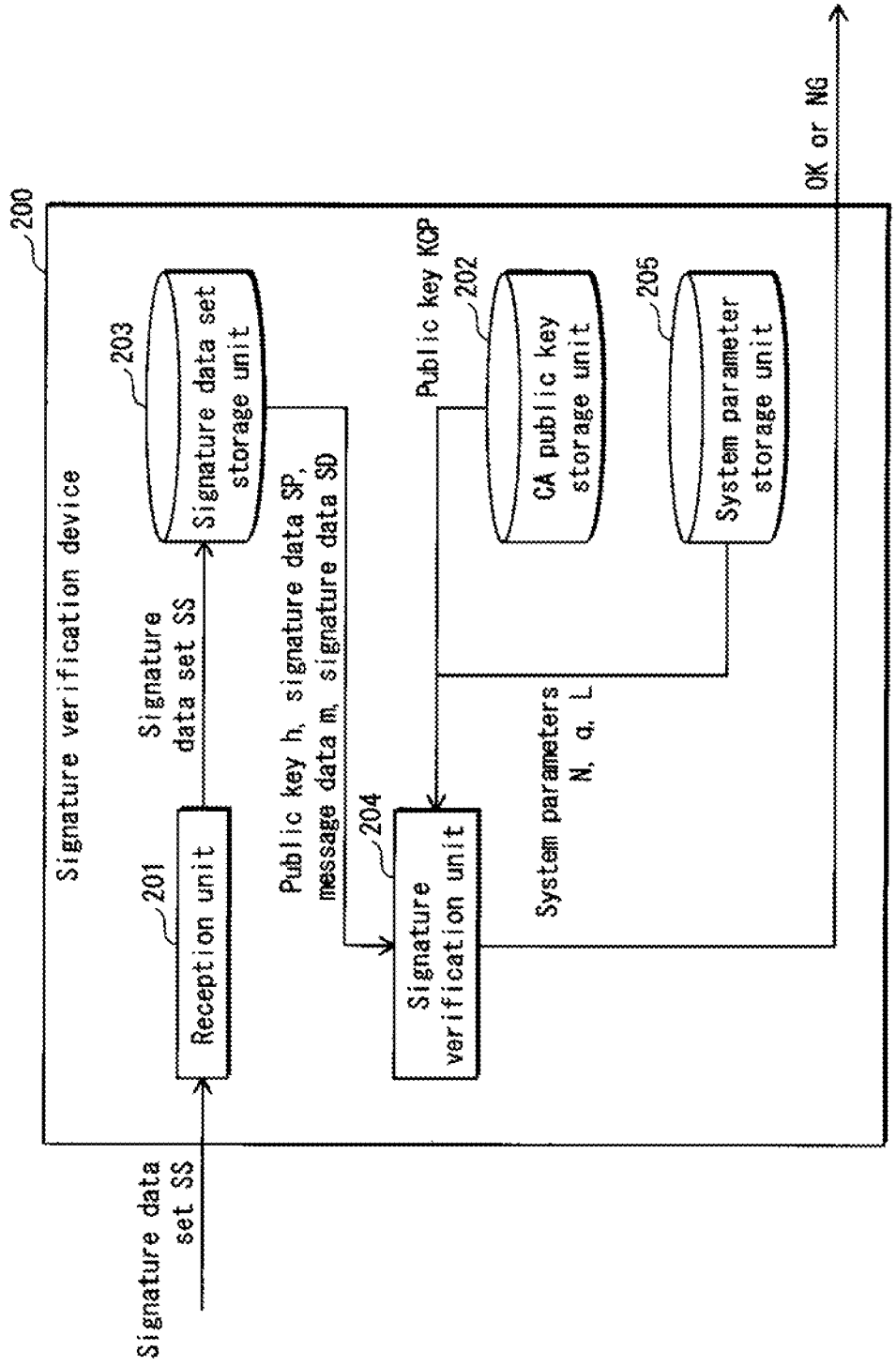
FIG. 11 is a block diagram showing a structure of a signature verification device 200.

As shown in FIG. 11, the signature verification device 200 comprises a reception unit 201, CA public key certificate storage unit 202, signature data set storage unit 203, signature verification unit 204, and system parameter storage unit 205.

Figure 12:
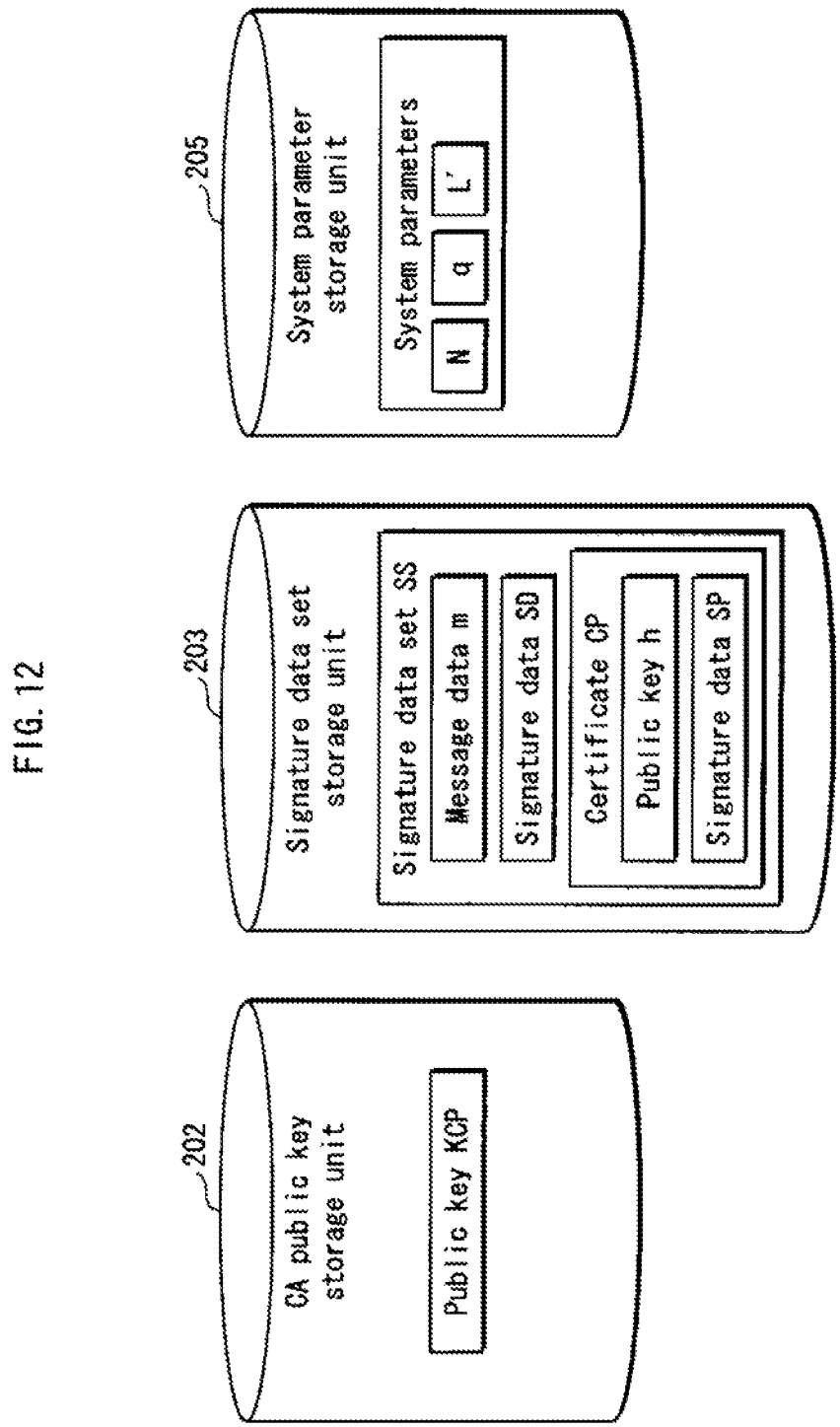
FIG. 12 shows data recorded in a CA public key certificate storage unit 202, a signature data set storage unit 203, and a system parameter storage unit 205, which are included in the signature verification device 200.

As shown in FIG. 12, the system parameter storage unit 205 stores, as pre-set system parameters, the parameter N, parameter q, and parameter U (distance).

As shown in FIG. 12, the CA public key certificate storage unit 202 pre-stores the public key KCP for the key generation device 300 in order to verify the certificate CP.

The reception unit 201 receives the signature data set SS transmitted by the signature generation device 100 via the transmission channel 20 and writes the received signature data set SS in the signature data set storage unit 203.

As shown in FIG. 12, the signature data set storage unit 203 stores the received signature data set SS. The signature data set SS is composed of message data m, signature data SD, and the certificate CP. The certificate CP includes the public key H and the signature data SP.

The signature verification unit 204 verifies the signature data SD included in the signature data set SS and also verifies the signature data SP included in the certificate CP.

(Structure of the Signature Verification Unit 204)

Figure 13:
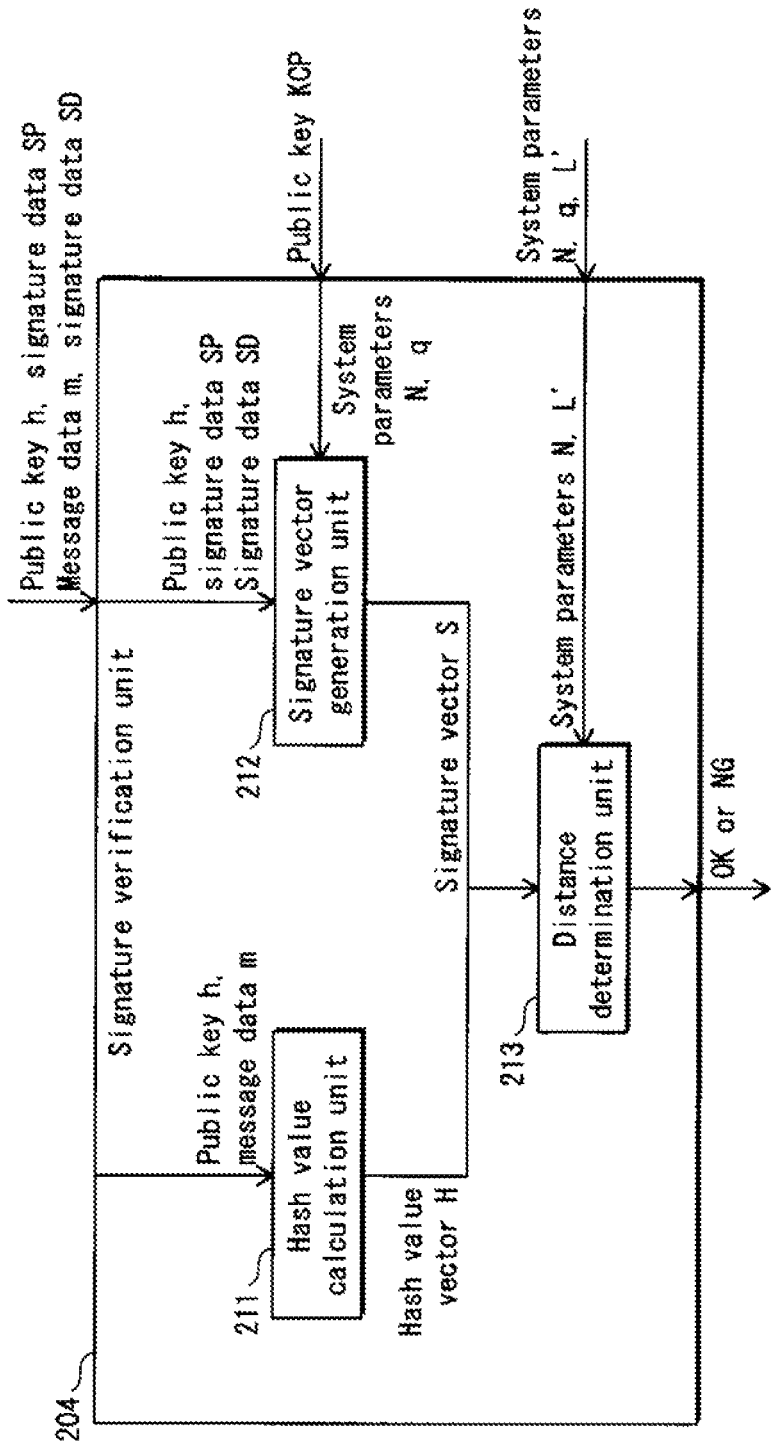
FIG. 13 is a block diagram showing a structure of a signature verification unit 204.

As shown in FIG. 13, the signature verification unit 204 is composed of a hash value calculation unit 211, signature vector generation unit 212, and a distance determination unit 213.

The signature verification unit 204 verifies the signature data SD and also verifies the signature data SP included in the certificate CP. The following is a description of signature verification of the signature data SD. Since verification can similarly be performed for the signature data SP by substituting the public key h for the message data m and signature data SP for signature data SD, details regarding verification of the signature data SP are omitted.

The hash value calculation unit 211 performs step SV1 during signature verification in the improved NTRUSign signature scheme to calculate a hash value vector H for message data m.

The signature vector generation unit 212 performs step SV2 during signature verification in the improved NTRUSign signature scheme to generate a signature vector S from the signature data SD.

The distance determination unit 213 performs step SV3 during signature verification in the improved NTRUSign signature scheme to calculate the distance between the hash value vector H and the signature vector S. If this distance is equal to or less than L', the signature data is determined to be valid. If the distance is larger than L', the signature data is determined to be invalid.

(3) Structure of Key Generation Device 300

Figure 14:
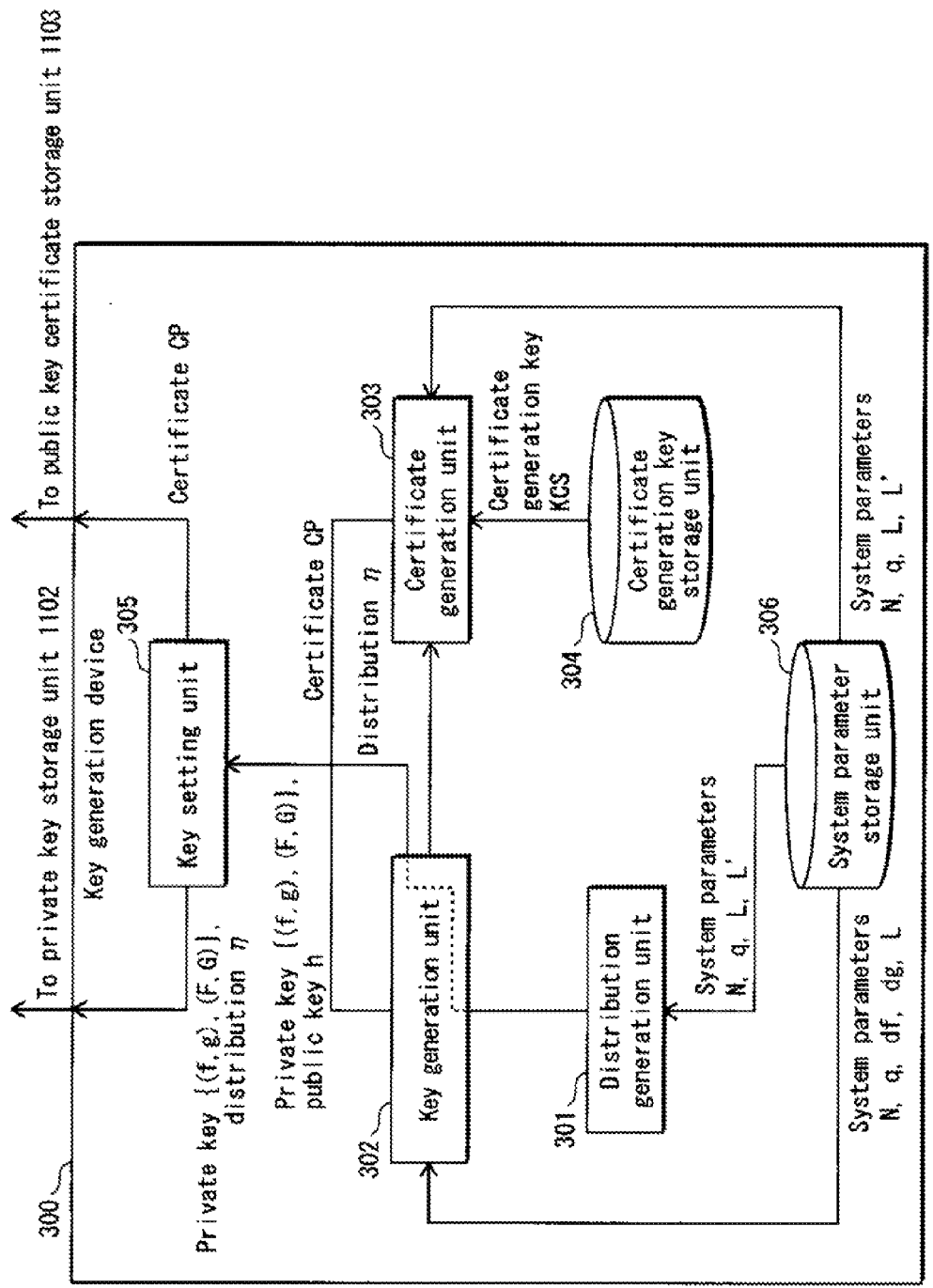
FIG. 14 is a block diagram showing a structure of a key generation device 300.

As shown in FIG. 14, the key generation device 300 is provided with a distribution generation unit 301, key generation unit 302, certificate generation unit 303, certificate generation key storage unit 304, key setting unit 305, and a system parameter storage unit 306.

Figure 15:
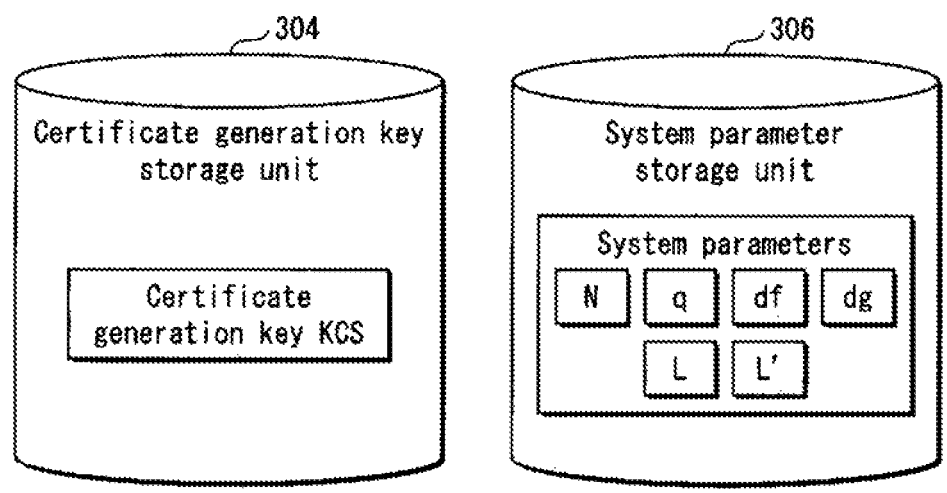
FIG. 15 shows data recorded on a certificate generation key storage unit 304 and a system parameter storage unit 306 included in the key generation device 300.

As shown, in FIG. 15, the system parameter storage unit 306 stores, as pre-set system parameters, the parameter N, parameter q, parameter L' (distance), parameter L (distance), and parameters df, dg.

As shown in FIG. 15, the certificate generation key storage unit 304 pre-stores a certificate generation key KCS, which is the private key for the key generation device 300.

The distribution generation unit 301 generates a distribution η during key generation in the Improved NTRUSign signature scheme by generating, for example, the distribution table 410 shown in FIG. 3 or the distribution table 450 shown in FIG. 5. The distribution generation unit 301 then outputs the distribution η thus generated to the key generation unit 302.

Specifically, the distribution generation unit 301 generates the distribution table 410 as follows.

The distribution generation unit 301 reads parameter N and parameter L from the system parameter storage unit 306 and generates a distribution table that includes regions for storing 2·N pairs of threshold limit values. Next, for each pair of threshold limit values, the distribution generation unit 301 generates a random number and randomly sets the lower limit included in the pair of threshold limit values. Subsequently, the distribution generation unit 301 generates a random number and randomly sets the upper limit to be larger than the lower limit. The distribution generation unit 301 determines the lower limit and the upper limit for all of the pairs of threshold limit values. The lower limits and upper limits thus determined are stored in the distribution table. The distribution table 410 is generated in this way. Note that each lower limit and upper limit are determined so that the norm of the vectors in the distribution is equal to or less than L.

As another example, the distribution generation unit 301 may generate the distribution table 450 as follows.

The distribution generation unit 301 reads parameter N and parameter L from the system parameter storage unit 306, generates a random number, and determines the number of partial tables included in the distribution table 450. The generated random number may, for example, be three. In this case, three partial tables are generated, with each partial table being provided with regions for storing 2·N pairs of threshold limit values. Next, three probabilities of occurrence (each of which is larger than zero and less than one) are randomly determined. These three probabilities of occurrence are chosen so that their total equals one.

Next, for each partial table, a lower limit and upper limit included in each pair of threshold limit values is determined in the same way as the distribution table 410 described above and stored in the partial tables.

The key generation unit 302 reads parameter N, parameter q, parameters df and dg, find parameter L from the system parameter storage unit 306 and, as described above, generates a private key $\{(f,g),(F,G)\}$ and a public key h via the key generation method in the improved NTRUSign signature scheme. The key generation unit 302 receives the distribution η from the distribution generation unit 301. Next, the key generation unit 302 outputs the private key $\{(f,g),(F,G)\}$, public key h, and distribution η to the key setting unit 305. The key generation unit 302 also outputs the public key h to the certificate generation unit 303.

The certificate generation unit 303 reads the certificate generation key KCS from the certificate generation key storage unit 304, receives the public key h from the key generation unit 302, and using the certificate generation key KCS thus read, generates a certificate CP for the public key h. The certificate CP is composed of the public key h and of signature data SP that Is based on the certificate generation key KCS for the public key h. Note that the signature data SP is generated using the same method as in signature generation by the signature generation unit 104 of the signature generation device 100.

The key setting unit 305 writes $\{(fg),(F,G)\}$ and distribution n as the private key in the private key storage unit 102 of the signature generation device 100. The key setting unit 305 also writes the certificate CP in the public key certificate storage unit 103 of the signature generation device 100.

3. Operations of Digital Signature System 10

(1) Outline of Operations of Digital Signature System 10

Figure 16:
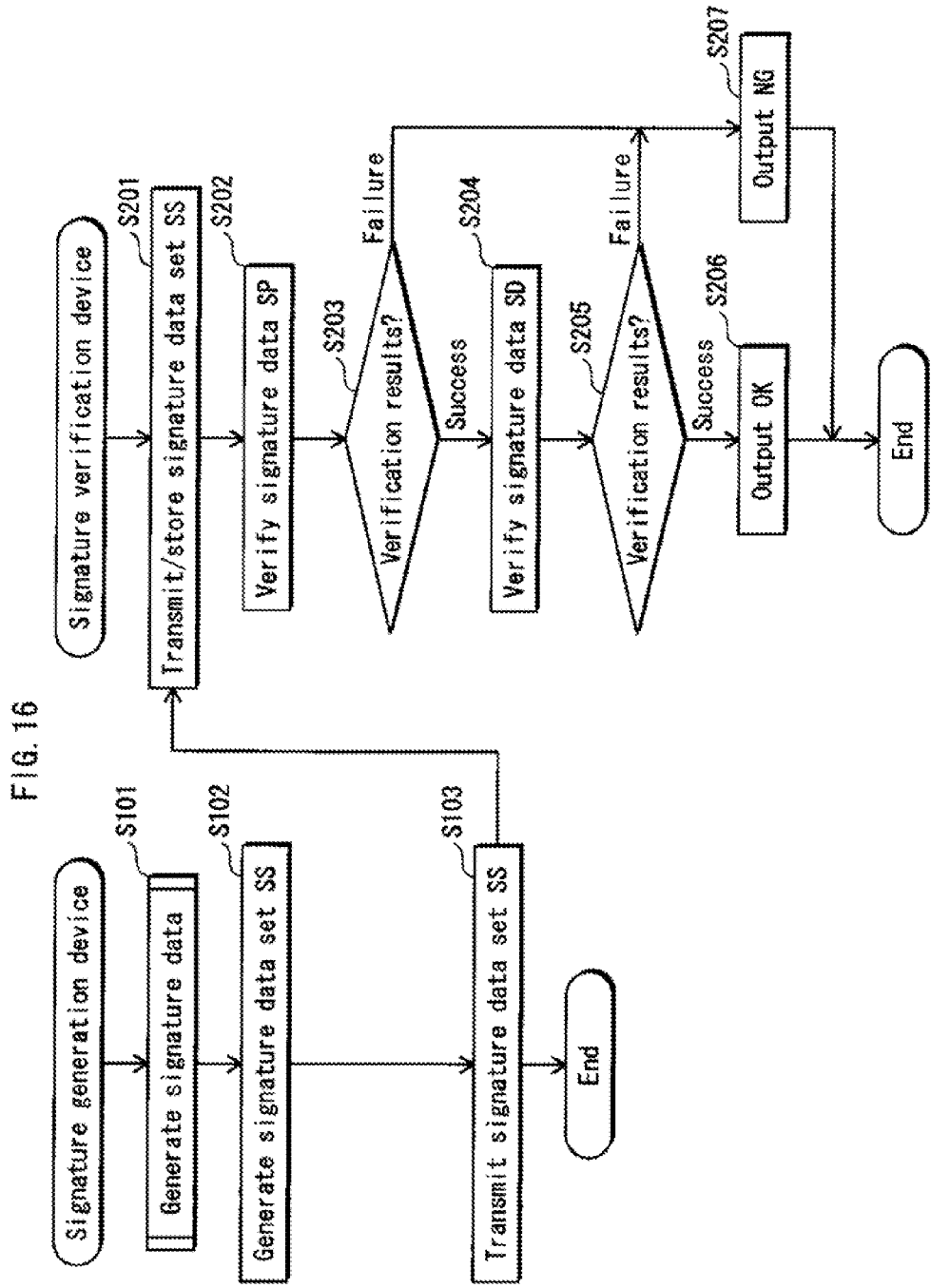
FIG. 16 is a flowchart showing operations of the digital signature system 10.

The following outlines the operations of the digital signature system 10 with reference to the flowchart in FIG. 16.

The signature generation device 100 generates signature data (step S101), generates a signature data set SS (step S102), and transmits the signature data set SS thus generated to the signature verification device 200 via the transmission channel 20 (step S103).

The reception unit 201 of the signature verification device 200 receives the signature data set SS transmitted by the signature generation device 100 via the transmission channel 20 and stores the received signature data set SS in the signature data set storage unit 203 (step S201).

For a public key h and its signature data SP included in the certificate CP in the signature data set SS, the signature verification unit 204 verifies whether the signature data SP is a valid signature for the public key h using the public key KCP of the key generation device 300 stored in the CA public key storage unit 202 (step S202). If the signature data SP is not valid (step S203), the signature verification unit 204 outputs "NG" (step S107), and processing ends.

When the signature data SP is valid (step S203), then for the message data m and corresponding signature data SD in a signature data set SS, the signature verification unit 204 verifies whether the signature data SD is a valid signature for the message data m using the public key h (step S204), If the signature data SD is not valid (step S205), the signature verification unit 204 outputs "KG" (step S207), and processing ends. If the signature data SD is valid (step S205), the signature verification unit 204 outputs "OK" (step S206), and processing ends.

(2) Operations of Signature Generation Device 100

Figure 17:
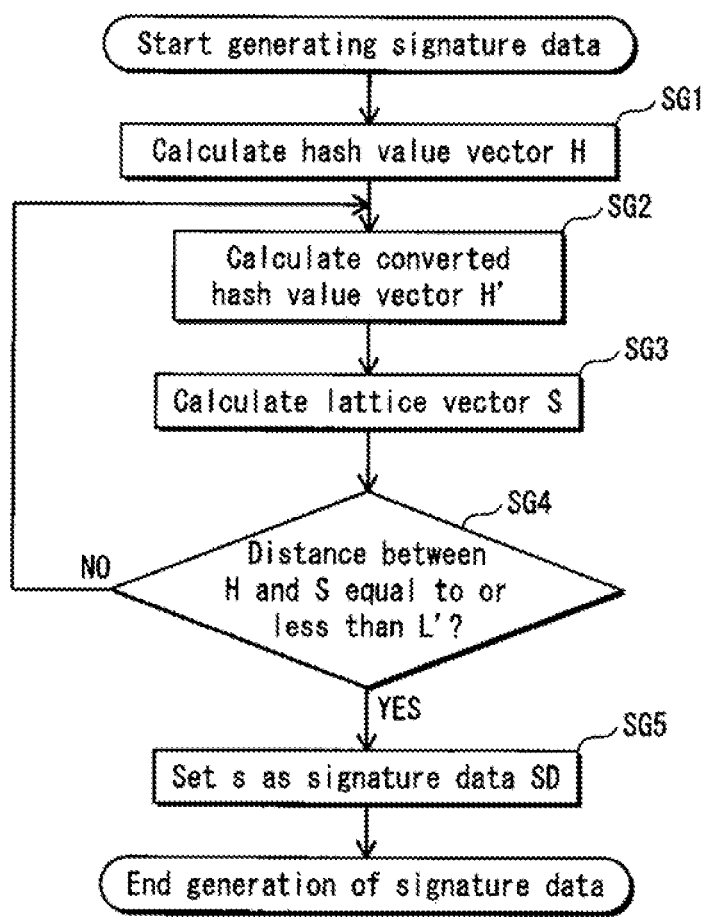
FIG. 17 is a flowchart showing operations of the signature generation device 100.

The following describes the operations of the signature generation device 100 with reference to the flowchart in FIG. 17.

The hash value calculation unit 111 calculates a hash value vector H for message data m (step SG1).

The vector generation unit 112 generates a vector V, and the hash value conversion unit 113 generates a converted hash value vector H'=H+V (step SG2).

The signature generation unit 114 generates a signature vector S=(s,t) (step SG3).

The signature confirmation unit 115 confirms the signature vector (step SG4). If the results of confirmation indicate that the hash value vector and the signature vector are not equal to or less than distance L' (step SG4: NO), processing returns to step SG2 and begins again with the vector generation unit 112. If the distance is equal to or less than distance L' (step SG4: YES), s in the signature vector S=(s,t) is set as the signature data SD (step SG5).

(3) Operations of Signature Verification Unit 204 in Signature Verification Device 200

Figure 18:
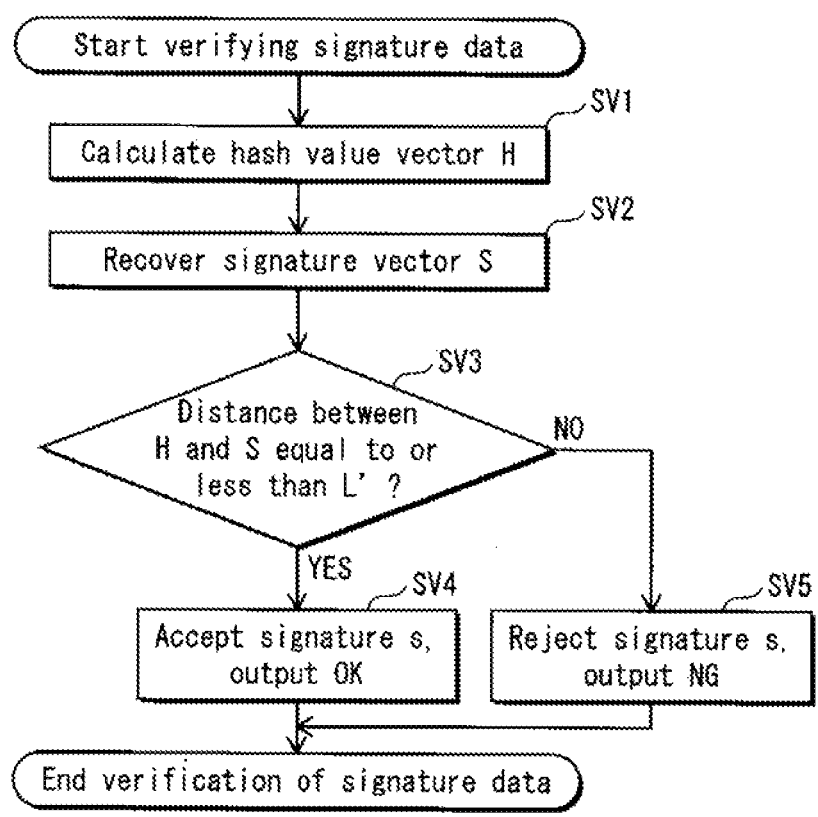
FIG. 18 is a flowchart showing operations for signature verification by the signature verification device 200.

The following describes the operations for signature verification by the signature verification unit 204 in the signature verification device 200 with reference to the flowchart in FIG. 18.

The signature verification unit 204 performs the following steps: calculating a 2·N dimensional vector H=(m1,m2), which is a hash value for message data m (step SV1); calculating a polynomial t via t=s×h(mod q) using the public key h to recover the signature vector S=(s,t) (step SV2); calculating the distance between H and S and determining whether the calculated distance Is equal to or less than L' (step SV3); and determining the signature s to be valid and accepting the signature s if the distance is equal to or less than L' (step SV3; YES), outputting "OK" (step SV4). If the distance is larger than L' (step SV3: NO), then the signature s is rejected as invalid, and the result "NG" is output (step SV5).

(4) Operations of Key Generation Device 300

Figure 19:
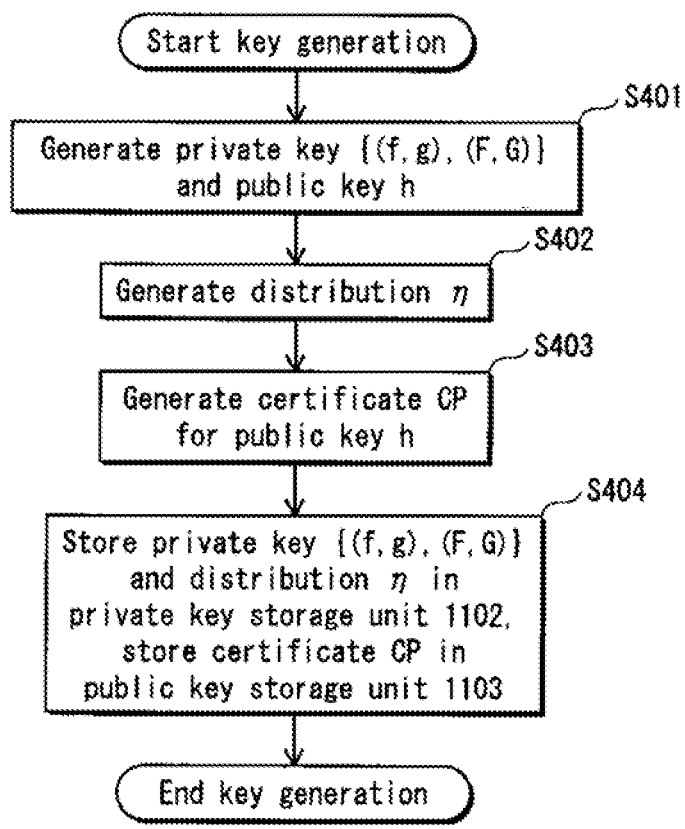
FIG. 19 is a flowchart showing operations of a key generation device 1300.
Figure 20:
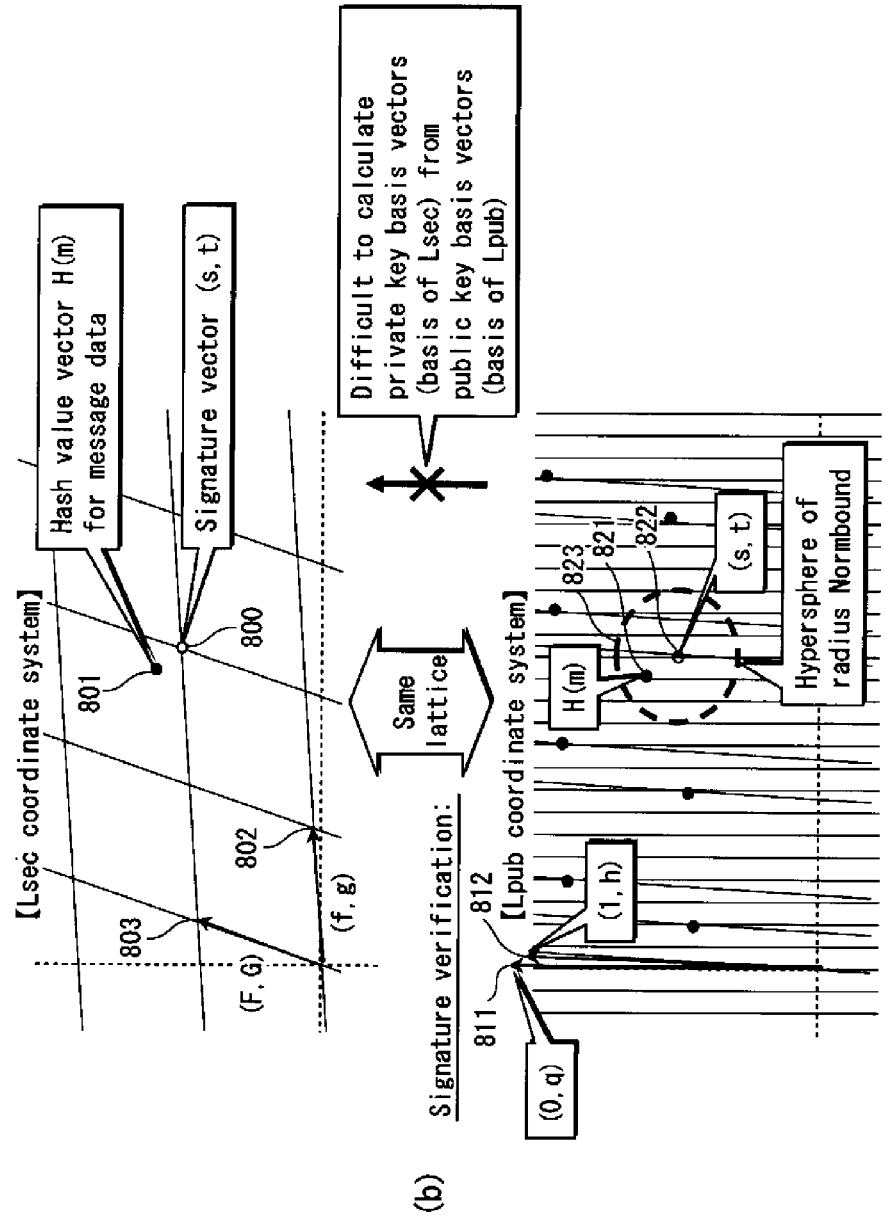

The key generation device 300 sets the private key $\{(f,g),(F,G)\}$, distribution η, and certificate CP in the signature generation device 100. The following describes this operation with reference to the flowchart in FIG. 19.

The key generation unit 302 in the key generation device 300 generates a private key $\{(f,g),(EG)\}$ and a public key h (step S401). The distribution generation unit 301 generates a distribution η (step S402), The certificate generation unit 303 uses the certificate generation key KCS stored in the certificate generation key storage unit 304 to generate a certificate CP for the public key h (step S403). The key setting unit 305 stores the private key $\{(f,g),(F,G)\}$, distribution η, and certificate CP in the private key storage unit 102 and the public key certificate storage unit 103 of the signature generation device 100 (step S404).

4. Advantageous Effects of Embodiment 1

Figure 7:
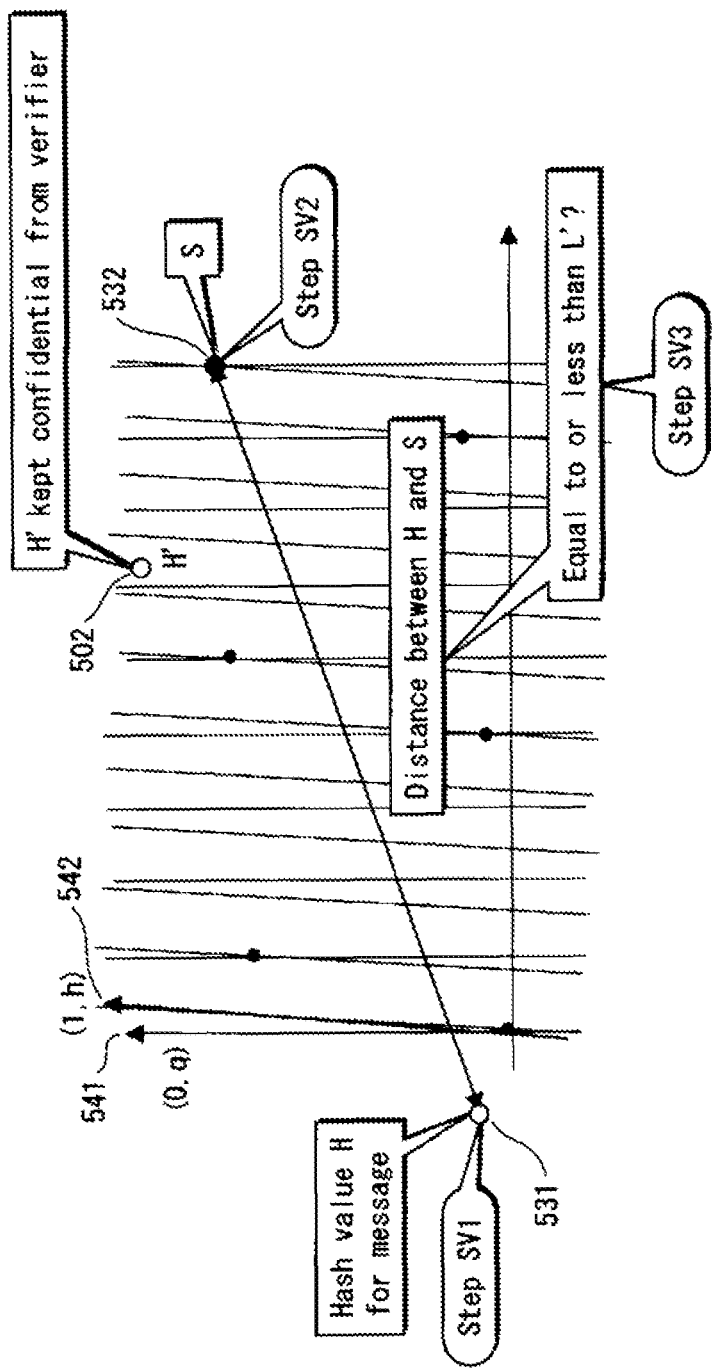
FIG. 7 shows signature verification in an improved NTRUSign signature scheme.

In the digital signature system 10 in embodiment 1, as shown in FIG. 7, the converted hash value vector H', which is the closest lattice vector to the signature vector S, is not transmitted to the verifier, but rather is kept confidential. Accordingly, a transcript attack is difficult, since when an attacker eavesdrops on the transmission channel during transmission to the verifier, or when verifiers themselves are attackers, the attacker cannot know the distribution of the difference between a vector and the closest lattice vector when attempting a transcript attack.

A transcript attack takes advantage of how, after eliminating the relationship with the private key, the difference between each signature vector and hash value is a uniform distribution. The attacker collects multiple pieces of signature data and uses information on the distribution of the difference (e.g. the range of the distribution and the probability of occurrence) to statistically remove the uniform distribution part, thereby extracting the part corresponding to the private key. When a transcript attack unfolds by using the distribution of the difference between the signature vector and hash value vector, since the range of the distribution is private and cannot be a known range, an attack to predict the distribution is impossible, thus making this sort of attack difficult. The following describes this idea in slightly more detail.

The signature vector is a vector for the lattice point closest to a converted hash value vector which is obtained by converting a hash value vector using a distribution η. Since the range of the distribution η is private, an attacker does not know the difference in the distribution between the signature vector and the hash value vector. This makes the above type of attack difficult.

Furthermore, even if the attacker knows the range of the distribution, the distribution is not uniform, and when the probability of occurrence of each partial region is unknown, as in FIG. 4, a transcript attack is similarly difficult.

Note that even if an attacker knows the range of the distribution and the probabilities of occurrence, the range of the distribution is broadened by adding a random vector V to the hash value vector. In a transcript attack, a sample number of signatures that depend on the size of the distribution are necessary in order to remove the uniform distribution part. The range of the distribution is broadened by adding a random vector V, thus increasing the sample number of signatures necessary for a transcript attack. This makes the attack difficult.

5.

As described above, it is an object of the present invention to provide a signature method in which the lattice problem serves as the basis for security, in particular a digital signature system based on the NTRUSign signature scheme.

One aspect of the present invention is a signature generation device that generates signature data for message data using a signature method, the signature method using a closest, vector problem for a lattice formed by vectors as a basis for security and comprising the steps of: generating a private key and a public key, the private key including information for forming private key basis vectors that are private lattice basis vectors and the public key including information for forming public key basis vectors that are public basis vectors expressing the same lattice as the private key basis vectors; generating the signature data for the message data using the private key, the signature data being composed of one or more elements of the lattice; and verifying the signature data using the public key, the signature generation device comprising: a private key storage unit that stores the private key which is used to generate the signature data; and a signature generation unit operable to generate the signature data for the message data using the private key stored by the private key storage unit, the signature data being an element of the lattice, wherein the private key includes a predetermined vector distribution, and the signature generation unit includes: a vector generation subunit that generates a vector in accordance with the distribution; a message conversion subunit that generates converted message data by converting the message data in accordance with the vector; and a signature generation subunit that generates the signature data using the converted message data as the message data.

The distribution may not be uniform.

A range of the distribution may be private.

The range of the distribution may be divided into a plurality of regions, a selection probability of each region may be predetermined, and the vector generation subunit may determine the region in accordance with, the selection probability and generate a vector in accordance with the region thus selected.

The vector generation subunit may generate a vector selected at random in accordance with the distribution, and the message conversion subunit may generate the converted message data by adding the vector to the message data.

The vector generation subunit may generate a vector by random selection from a plurality of vectors pre-selected in accordance with the distribution.

The distribution may be included in a hypersphere having a radius of a predetermined distance L.

The public key may include a distance V related to the distance L, and when a distance between the message data and the signature data is not equal to or less than L', the signature generation unit may recalculate the converted message data.

The public key may include the distance L'.

The distance L' may be a system parameter of the signature method.

The private key basis vectors may be obtained from, the set (f,g,F,G), each of which is an element of a ring R formed by an N dimensional array defined by addition, subtraction, multiplication, and a norm that indicates the size of the elements. For the ring R and a positive integer q, the set (f,g,F,G) is based on elements (f,g) of the ring R, on an element Fq which, is the inverse of f(mod q), and on (F,G), which satisfies f×G−g×F=q. The public key basis vectors may be obtained from the element h, which is congruent modulo q with a product of the element Fq and the element g for the positive integer q.

The private key storage unit may be provided with tamper resistance.

Another aspect of the present invention is a signature verification device that verifies signature data for message data using a signature method, the signature method using a closest, vector problem for a lattice formed by vectors as a basis for security and comprising the steps of: generating a private key and a public key, the private key including information for forming private key basis vectors that are private lattice basis vectors and the public key including information for forming public key basis vectors that are public basis vectors expressing the same lattice as the private key basis vectors; generating the signature data for the message data using the private key, the signature date being composed of one or more elements of the lattice; and verifying the signature data using the public key, the signature verification device comprising: a public key storage unit that stores the public key which is used to verify the signature data; and a signature verification unit operable to verify the signature data for the message data using the public key stored by the public key storage unit, the signature data being an element of the lattice, wherein the private key includes a distribution of a predetermined vector included in a hypersphere of a predetermined distance L, the public key includes a distance U related to the distance L, and the signature verification unit determines whether a distance between the message data and the signature data is equal to or less than L'.

The present invention may also be an authentication data generation device that uses a signature method to generate authentication data, which is response data for challenge data, the signature method using a closest vector problem for a lattice formed by vectors as a basis for security and comprising the steps of: generating a private key and a public key the private key including information for forming-private key basis vectors that are private lattice basis vectors and the public key including information for forming public key basis vectors that are public basis vectors expressing the same lattice as the private key basis vectors; generating the signature data for the message data using the private key, the signature data being composed of one or more elements of the lattice; and verifying the signature data using the public key, the authentication data generation device comprising: a private key storage unit that stores the private key which is used to generate the authentication data; and an authentication data generation unit operable to generate the authentication data for the challenge data using the private key stored in the private key storage unit, wherein the private key includes a predetermined vector distribution, and the authentication data generation unit includes; a vector generation subunit that generates a vector in accordance with the distribution; a message data generation subunit that generates the message data as a hash value for the challenge data; a message conversion subunit that generates converted challenge data by converting the message data in accordance with the vector; and an authentication data generation subunit that generates the signature data as the authentication data when the converted message data is used as the message data.

Another aspect of the present invention is a signature generation method for generating signature data for message data via a signature method that, uses a closest vector problem for a lattice formed by vectors as a basis for security, the signature generation method comprising the steps of: generating a private key and a public key, the private key including information for forming private key basis vectors that are private lattice basis vectors and the public key including information for forming public key basis vectors that are public basis vectors expressing the same lattice as the private key basis vectors; generating the signature data for the message data using the private key, the signature data being composed of one or more elements of the lattice; and verifying the signature data using the public key, wherein the private key includes a distribution of a predetermined vector, and in the signature generation step, the signature data for converted message data is generated using the private key basis vectors, the converted message data being converted using a vector in accordance with the distribution, and the signature data being an element of the lattice.

The distribution may not be uniform.

A range of the distribution may be private.

The range of the distribution may be divided into a plurality of regions, a selection probability of each region may be predetermined, and in the signature generation step, the region may be selected in accordance with the selection probability, and a vector generated in accordance with the region thus selected may be used.

During the signature generation step, the converted message data may be generated by adding a vector, selected at random in accordance with the distribution, to the message data.

The distribution may be included in a hypersphere having a radius of a predetermined distance L.

Another aspect of the present invention is a program that causes a signature generation method to generate signature data for message data via a signature method that uses a closest vector problem for a lattice formed by vectors as a basis for security, the program causing the signature generation device to perform the steps of: generating a private key and a public key, the private key including information for forming private key basis vectors that are private lattice basis vectors and the public key including information for forming public key basis vectors that are public basis vectors expressing the same lattice as the private key basis vectors; generating the signature data for the message data using the private key, the signature data being composed of one or more elements of the lattice; and verifying the signature data using the public key, wherein the private key includes a distribution of a predetermined vector, and in the signature generation step, the signature data for converted message data is generated using the private key basis vectors, the converted message data being converted using a vector in accordance with the distribution, and the signature data being an element of the lattice.

The program may be recorded on a recording medium.

Another aspect of the present invention is an integrated circuit in a signature generation device that generates signature data for message data using a signature method, the signature method using a closest vector problem for a lattice formed by vectors as a basis for security and comprising the steps of: generating a private key and a public key, the private key including information for forming private key basis vectors that are private lattice basis vectors and the public key including information for forming public key basis vectors that are public basis vectors expressing the same lattice as the private key basis vectors, generating the signature data for the message data using the private key, the signature data being composed of one or more elements of the lattice; and verifying the signature data using the public key, the signature generation device comprising: a private key storage unit that stores the private key which is used to generate the signature data; and a signature generation unit operable to generate the signature data for the message data using the private key stored by the private key storage unit, the signature data being an element of the lattice, wherein the private key includes a distribution of a predetermined vector, and the signature generation unit includes: a vector generation subunit that generates a vector in accordance with the distribution; a message conversion subunit that generates converted message data by converting the message data in accordance with the vector; and a signature generation subunit that generates the signature data using the converted message data as the message data.

Another aspect of the present invention is a digital signature system composed of a signature generation device that generates signature data for message data using a signature method and a signature verification device that verifies the signature data, the signature method using a closest vector problem for a lattice formed by vectors as a basis for security and comprising the steps of: generating a private key and a public key; the private key including information for forming private key basis vectors that are private lattice basis vectors and the public key including information for forming public key basis vectors that are public basis vectors expressing the same lattice as the private key basis vectors; generating the signature data for the message data using the private key, the signature data being composed of one or more elements of the lattice; and verifying the signature data using the public key, the signature generation device comprising: a private key storage unit that stores the private key which is used to generate the signature data; and a signature generation unit operable to generate the signature data for the message data using the private key stored by the private key storage unit, the signature data being an element of the lattice, the signature verification device comprising: a public key storage unit that stores the public key which is used to verify the signature data; and a signature verification unit operable to verily the signature data for the message data using the public key stored by the public key storage unit, the signature data being an element of the lattice, wherein the private key includes a distribution of a predetermined vector, the signature generation unit includes: a vector generation subunit that generates a vector in accordance with the distribution; a message conversion subunit that generates converted message data by converting the message data in accordance with the vector; and a signature generation subunit that generates the signature data using the converted message data as the message data, and the signature verification unit determines a distance between the message data and the signature data.

6. Modifications

The above embodiment is only an example of the present invention, and the present invention is in no way limited to this embodiment. A variety of embodiments that do not deviate from the aim of the invention are possible. For example, the following modifications are also included in the present invention.

(1) The digital signature system in embodiment 1 selects a random vector in accordance with a distribution, but a vector in accordance with the distribution may be pre-stored, and the pre-stored vector may be used. Alternatively, a plurality of vectors in accordance with a plurality of distributions may be pre-stored, and one vector may be selected from among the pre-stored plurality of vectors.

(2) In the digital signature system 10, the converted hash value vector is generated by adding a vector V, but the invention is not limited in this way. For example, a converted hash value vector may be generated by adding the vector V multiplied by n (n being an integer other than 0). The converted hash value may also be generated by subtracting the vector V.

(3) L and L' in the improved NTRUSign signature scheme are respectively 200 and 500 in embodiment 1, but other values may be used. For example, L and L' may respectively be 50 and 350. In embodiment 1, the difference between L and L' is approximately Normbound as in the conventional NTRUSign signature scheme, but this difference may be smaller than Normbound. L' may be any value such that the distance between almost all hash value vectors and properly generated signature vectors is equal to or less than L'.

(4) In the improved NTRUSign signature scheme, the distance L is disclosed as a system parameter, but this distance may be different for each, user that generates a signature. In tins case, L' may be included in the public key and disclosed to the user verifying a signature. The distance L may also be kept private.

(5) In the improved NTRUSign signature scheme, the distributions 400 and 432 shown in FIGS. 2 and 4 are used as the distribution η, but the distribution η is not limited in this way. For example, one of the components in a certain dimension (e.g. the $i^{th}$ component, that is, the $(i-1)^{th}$ term) may be limited to a predetermined range (such as between 2 and 5, inclusive).

(6) In the NTRUSign signature scheme, when the private key (f,g),(F,G) is set as the lattice basis vectors (private key basis vectors) and (1,h),(0,q), which is obtained from h in the public key and from the system parameter q, is set as the lattice basis vectors (public key basis vectors), the lattice points obtained from these basis vectors are the same, and the NTRUSign signature scheme is thus said to be based on the lattice problem (lattice closest vector problem). The improved NTRUSign signature scheme similarly has private key basis vectors and public key basis vectors.

In the present invention, an improved NTRUSign signature scheme based on the NTRUSign signature scheme is used, but the present invention is not limited in this way, A signature method wherein a transcript attack is based on a different lattice problem, such as the GGH signature method, may be used. A signature method based on a lattice problem against which a transcript attack can be performed may be used. For example, the GGH signature method may be adopted. Non-Patent Literature 6 describes the GGH signature method in detail. A signature method whose basis for security for signatures is a different lattice closest vector problem may also be adopted.

(7) The following describes another example of a distribution table, which is the data configuration of the distribution η.

Figure 21:
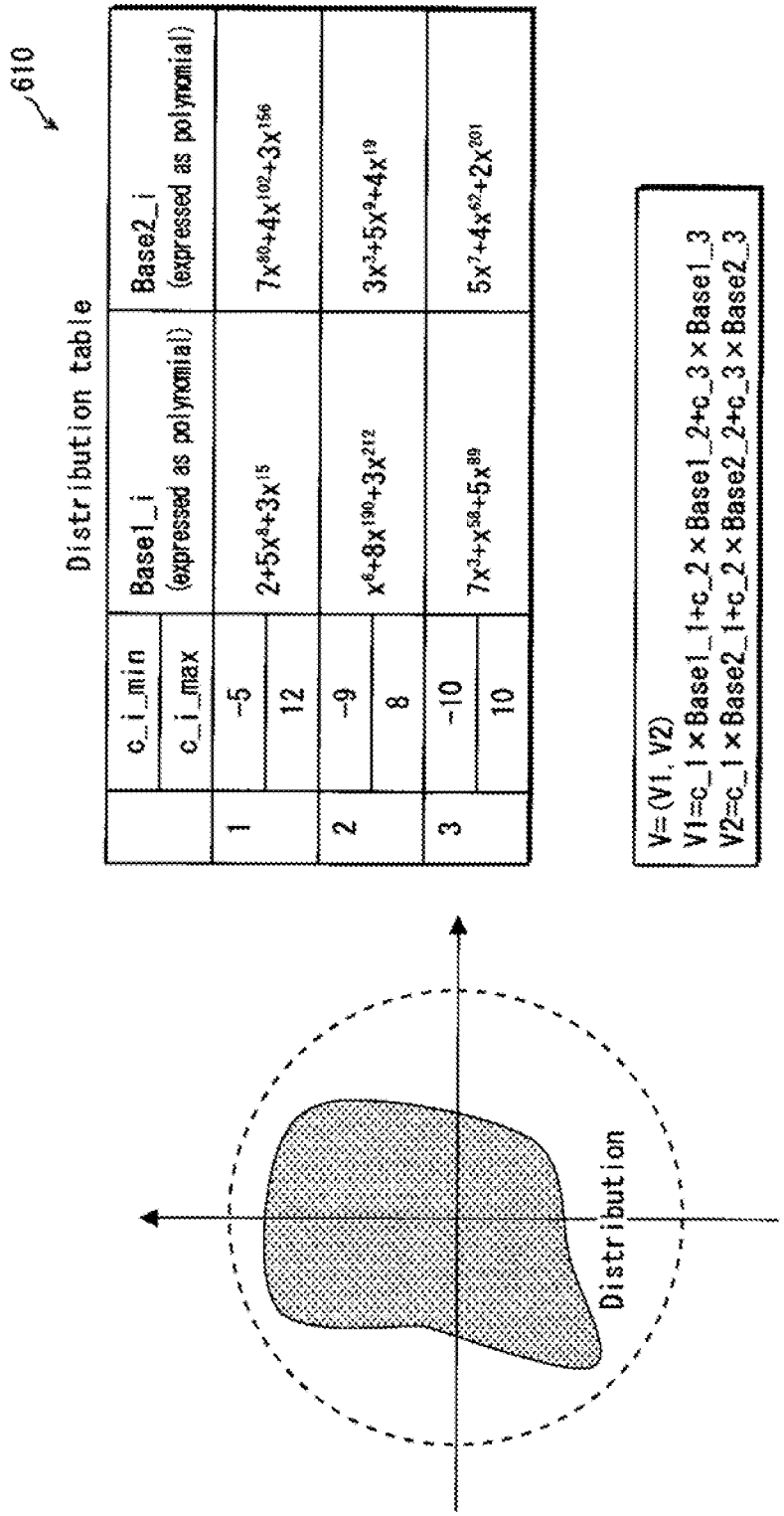
FIG. 21 shows a data structure of a distribution table 610.

The distribution table 610 shown in FIG. 21 is composed of three pieces of distribution information i (i=1, 2, 3). A piece of distribution information i includes a lower limit $C\_i\_min$, upper limit $C\_i\_max$, polynomial Base1_i, and polynomial Base2_i.

When i=1, $C\_1$ is uniformly and randomly selected to be equal to or greater than the lower limit $C\_1\_min$ and equal to or less than the upper limit $C\_1\_max$. When i=2, $C\_2$ is uniformly and randomly selected to be equal to or greater than the lower limit $C\_2\_min$ and equal to or less than the upper limit $C\_2\_max$. When i=3, $C\_3$ is uniformly and randomly selected to be equal to or greater than the lower limit $C\_3\_min$ and equal to or less than the upper limit $C\_3\_max$.

Next V1=$C\_1 \times$Base1_1+$C\_2 \times$Base1_2+$C\_3 \times$Base1_3 and V2=$C\_1 \times$Base2_1$\times C\_2 \times$Base2_2+$C\_3 \times$Base2_3 are calculated, and V is set to (V1,V2).

The vector in the above distribution with the largest norm, V_max(=(V1_max,V2_max)), is:

$$V1\_max = c\_1\_max \times Base1\_1 + c\_2\_min \times Base1\_2 + c\_3\_max \times Base1\_3$$

$$V2\_max = c\_1\_max \times Base2\_1 + c\_2\_min \times Base2\_2 + c\_3\_max \times Base2\_3$$

The norm is 194.9<200,

In the distribution table 610, the base polynomials Base1_i, Base2_i(i=1, 2, 3) have three coefficients (weights), but the number of coefficients is not limited in this way. For example, there may be two coefficients, or tour or more coefficients.

Also, in the distribution table 610, there are three polynomials for both Base1_i and Base2_i, there may be two polynomials, or four or more polynomials.

(8) The following describes yet another example of a distribution table, which is the data configuration of the distribution η.

Figure 22:
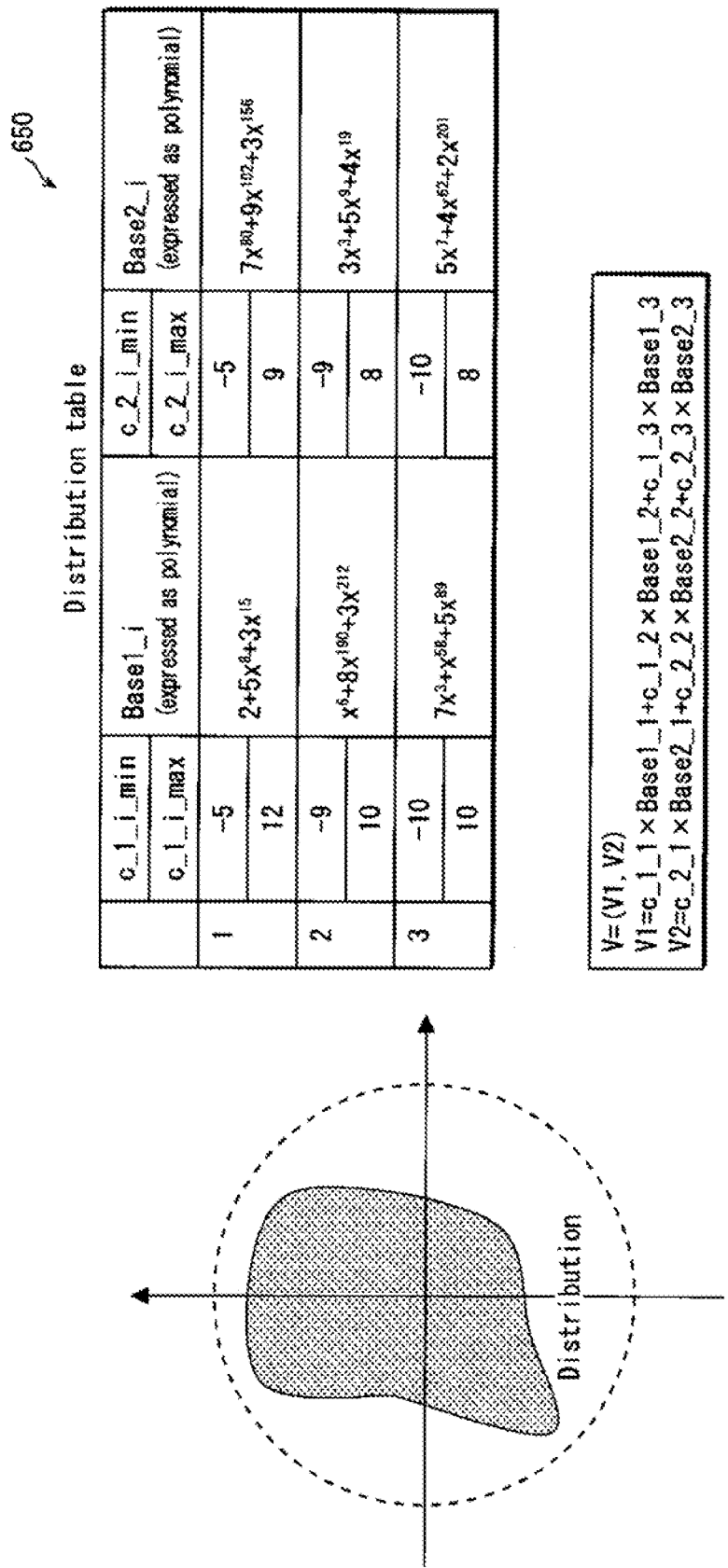
FIG. 22 shows a data structure of a distribution table 650.

The distribution table 650 shown in FIG. 22 is composed of three pieces of distribution information i(i=1, 2, 3). A piece of distribution information i includes first sub-distribution information and second sub-distribution information. The first sub-distribution information includes a lower limit $C\_1\_i\_min$, an upper limit $C\_1\_i\_max$, and a polynomial Base1_i. The second sub-distribution information includes a lower limit $C\_2\_i\_min$, an upper limit $C\_2\_i\_max$, and a polynomial Base2_i.

When i=1, $C\_1\_1$ is uniformly and randomly selected to be equal to or greater than the lower limit $C\_1\_1$ min and equal to or less than the upper limit $C\_1\_1\_max$. $C\_2\_1$ is uniformly and randomly selected to be equal to or greater than the lower limit $C\_2\_1\_min$ and equal to or less than the upper limit $C\_2\_1\_max$. When $i=2$, $C\_1\_2$ is uniformly and randomly selected to be equal to or greater than the lower limit $C\_1\_2\_min$ and equal to or less than the upper limit $C\_1\_2\_max$. $C\_2\_2$ is uniformly and randomly selected to be equal to or greater than the lower limit $C\_2\_2\_min$ and equal to or less than the upper limit $C\_2\_2\_max$. When $i=3$, $C\_1\_3$ is uniformly and randomly selected to be equal to or greater than the lower limit $C\_1\_3\_min$ and equal to or less than the upper limit $C\_1\_3\_max$. $C\_2\_3$ is uniformly and randomly selected to be equal to or greater than the lower limit $C\_2\_3\_min$ and equal to or less than the upper limit $C\_2\_3\_max$.

Next, $V1=C\_1\_1 \times Base1\_1 + C\_1\_2 \times Base1\_2 + C\_1\_3 \cdot Base\_1\_3$ and $V2=C\_2\_1 \times Base2\_1 + C\_2\_2 \times Base2\_2 + C\_2\_3 \times Base2\_3$ are calculated, and V is set to (V1,V2).

The vector in the above distribution with the largest norm, $V\_max(=(V1\_max, V2\_max))$, is:

$$V1\_max = c\_1\_1\_max \times Base1\_1 + c\_1\_2\_max \times Base1\_2 + c\_1\_3\_max \times Base1\_3$$

$$V2\_max = c\_2\_1\_max \times Base2\_1 + c\_2\_2\_min \times Base2\_2 + c\_2\_3\_min \times Base2\_3$$

The norm is $199.1 < 200$.

In this case, $c\_1\_i$ and $c\_2\_i$ are uniformly and randomly selected (generated) within a min and a max, but selection is not limited in this way. For example, selection may be random in accordance with a Gaussian distribution. In this case, the mean and the variance are pre-determined, and selection is made in accordance with a Gaussian distribution.

Note that the following reference describes the method of generating a Gaussian distribution in detail.

D. E. Knuth, "THE ART OF COMPUTER PROGRAMMING $2^{nd}$ ed., vol. 2: Seminumerical Algorithms", ADDISON-WESLEY, 1981, pp. 129-130.

(9) in the above embodiment, during signature verification, a signature was determined to be valid if "equal to or less than L", but signatures may be considered valid if "less than L". In this case, a signature would be determined to be invalid if "equal to or greater than L", rather than if "greater than L".

(10) The above embodiment and modifications are applicable to authorization. Authorization is verification that message data was in fact sent by the person indicated in the message data, or that no one tampered with the message data. The above embodiment and modifications are also applicable to personal identification. Personal identification, refers to verification, for example, that a person has the right to access data or a facility (i.e. entry access), or that a person is who he or she claims to be. Furthermore, the above embodiment and modifications are applicable to non-repudiation. Non-repudiation refers, for example, to challenging a person who denies having consented to something to which the person did in fact consent.

(11) Each of the above devices is, specifically, a computer system composed of a microprocessor, ROM, RAM, hard disk unit, display unit, keyboard, mouse, etc. Computer programs are stored on the RAM or the hard disk unit. By operating in accordance with the computer programs, the microprocessor achieves the functions of each device. In order to achieve predetermined functions, the computer programs are composed of a combination of multiple command codes that indicate instructions for tire computer.

Part or all of the components comprising each of the above-described devices may be assembled as one system Large Scale Integration (LSI). A system LSI is an ultra-multifunctional LSI produced by integrating multiple components on one chip and, more specifically, is a computer system including a microprocessor, ROM, RAM, and the like. Computer programs are stored in the RAM. The microprocessor operates according to the computer programs, and thereby the system LSI accomplishes its functions.

Part or all of the components comprising each of the above devices may be assembled as an IC card detachable from each device, or as a single module. The IC card/module is a computer system that includes a microprocessor, ROM, RAM, etc. The IC card/module may include therein the above-mentioned ultra-multifunctional LSI. The microprocessor operates according to computer programs, and the IC card/module thereby accomplishes its functions. The IC card/module may be tamper resistant.

The present invention may be the above-indicated methods. The present invention may be computer programs that achieve the methods by a computer or may be a digital signal comprising the computer programs.

The present invention may also be a computer-readable recording medium, such as a flexible disk, hard disk, CD-ROM, MO, DVD, DVD-ROM, DVD-RAM, BD (Blu-ray Disc), or semiconductor memory, on which the above-mentioned computer program or digital signal is recorded. The present invention may also be the digital signal recorded on such a recording medium.

The present invention may also be the computer programs or digital signal to be transmitted via networks, of which telecommunications networks, wire/wireless communications networks, and the Internet are representative, or via data broadcasting.

The present invention may also be a computer system comprising a microprocessor and memory, the memory storing the computer programs, and the microprocessor operating in accordance with the computer programs.

Also, another independent computer system may implement the computer programs or digital signal after the computer programs or digital signal are transferred via being recorded on the recording medium, via one of the above-mentioned networks, etc.

(12) The above embodiments and modifications may be combined with one another.

INDUSTRIAL APPLICABILITY

In a variety of industrial fields that require processing for authorization, personal identification, non-repudiation, etc., each device in the present invention can, on a commercial basis, be used continually and repeatedly when performing processing for authorization, personal identification, non-repudiation, etc. and can be manufactured continually and repeatedly.

The invention claimed is:

1. A method, used in a signature generation device and a signature verification device, for generating and verifying a signature for target data having one of a shortest vector problem and an approximate shortest vector problem as a basis for security, in which a vector is a multi-dimensional representation of data divided into a plurality of pieces, the method comprising the steps of:
   acquiring, using the signature generation device, the target data;
   converting, using the signature generation device, the target data using a private disturbance vector smaller than a first size to generate a converted vector;

generating, using the signature generation device, a signature vector for the converted vector by seeking, in a lattice whose basis vectors are determined by private key vectors, a lattice point closest to the converted vector and selecting a part of the signature vector as signature data;

recovering, using the signature verification device, the signature vector with public key vectors and the signature data, thus yielding a recovered signature vector, and verifying, using the signature verification device, whether a distance between a vector representing the target data and the recovered signature vector is equal to or less than a second size that is larger than the first size; and outputting, using the signature verification device, information indicating that verification is successful when the distance is equal to or less than the second size, wherein the first size is a size of a vector, and the second size is a size of a different vector, wherein each vector is represented as a polynomial, wherein the signature generation device stores a disturbance vector distribution table that includes, in correspondence, an upper limit on a coefficient, a lower limit on the coefficient, and a model polynomial serving as a basis for generating of the disturbance vector, and wherein the converting step randomly selects the coefficient between the upper limit and the lower limit, inclusive, multiplies the model polynomial by the selected coefficient, and treats the result as a polynomial representing the disturbance vector.

2. A signature generation device for generating signature data for target data having one of a shortest vector problem and an approximate shortest vector problem as a basis for security, in which a vector is a multi-dimensional representation of data divided into a plurality of pieces, the signature generation device comprising:

an acquisition unit operable to acquire the target data;

a private storage unit confidentially storing private key vectors;

a data conversion unit operable convert the target data acquired by the acquisition unit using a private disturbance vector smaller than a first size to generate a converted vector;

a signature generation unit operable to generate a signature vector for the converted vector by seeking, in a lattice whose basis vectors are determined by private key vectors, a lattice point closest to the converted vector and to select a part of the signature vector as signature data; and an output unit operable to output the target data and the signature data, wherein the first size is a size of a vector, and the second size is a size of a different vector, wherein each vector is represented as a polynomial, wherein the private storage unit further stores a disturbance vector distribution table that includes, in correspondence, an upper limit on a coefficient, a lower limit on the coefficient, and a model polynomial serving as a basis for generation of the disturbance vector, and wherein the data conversion unit randomly selects the coefficient between the upper limit and the lower limit, inclusive, multiplies the model polynomial by the selected coefficient, and treats the result as a polynomial representing the disturbance vector.

3. The signature generation device of claim 2, wherein the private storage unit further stores a distribution indicating a range to which belongs a plurality of candidate vectors, each candidate vector having a size smaller than the first size, and wherein from among the candidate vectors belonging to the range indicated by the distribution, the data conversion unit selects one candidate vector as the disturbance vector.

4. The signature generation device of claim 3, wherein the private storage unit has tamper resistance, and the private key and the distribution are kept confidential so as not to be divulged.

5. The signature generation device of claim 4, wherein in the range indicated by the distribution stored by the private storage unit, a plurality of candidate vectors are arranged so as to be selected with a probability that is not uniform, and wherein the data conversion unit selects one of the candidate vectors as the disturbance vector in accordance with the probability.

6. The signature generation device of claim 4, wherein the range indicated by the distribution includes a plurality of regions, a selection probability is pre-determined for each region, and a plurality of candidate vectors is arranged in each region, and wherein the data conversion unit selects one region in accordance with the selection probabilities, thus yielding a selected region, and selects one candidate vector from among the candidate vectors within the selected region as the disturbance vector.

7. The signature generation device of claim 4, wherein the data conversion unit includes:

a vector generation subunit that selects, from among the candidate vectors belonging to the range indicated by the distribution, one candidate vector as the disturbance vector, and an addition subunit that generates the converted vector by adding the disturbance vector to a vector that represents the target data.

8. The signature generation device of claim 7, wherein the vector generation subunit generates the disturbance vector by randomly selecting a candidate vector from among a plurality of candidate vectors pre-selected in accordance with the distribution.

9. The signature generation device of claim 4, wherein the distribution is included in a hypersphere having a radius of the first size.

10. The signature generation device of claim 4, further including a public storage unit storing a second size that is larger than the first size, wherein the data conversion unit is further operable to calculate a distance between a vector representing the target data and the converted vector and, when the distance is equal to or less than the second size, to convert the target data using a different private disturbance vector smaller than the first size, thus generating a different converted vector.

11. The signature generation device of claim 4, wherein the private key vectors are obtained from a set (f,g,F,G), each of which is an element of a ring R formed by an N dimensional array defined by addition, subtraction, multiplication, and a norm that indicates the size of elements, the set (f,g,F,G) being, for the ring R and a positive integer q, based on elements (f,g) of the ring R, on an element Fq which is the inverse of f(mod q), and on (F,G), which satisfies f×G−g×F=q, and wherein the public key vectors are obtained from an element h, which is congruent modulo q with a product of the element Fq and the element g for the positive integer q.

12. A signature verification device for verifying signature data, the signature data being generated by a signature generation device that, having one of a shortest vector problem and an approximate shortest vector problem as a basis for security, in which a vector is a multi-dimensional representation of data divided into a plurality of pieces, converts target data into a converted vector using a private disturbance vector smaller than a first size and selects a part of a signature vector as the signature data, the signature vector being a lattice point closest to the converted vector in a lattice whose basis vectors are determined by private key vectors, the signature verification device comprising:
 an acquisition unit operable to acquire the target data and the signature data;
 a storage unit storing public key vectors;
 a verification unit operable to recover the signature vector with the public key vectors and the signature data, thus yielding a recovered signature vector, and to verify whether a distance between a vector representing the target data and the recovered signature vector is equal to or less than a second size that is larger than the first size; and
 an output unit operable to output information indicating that verification is successful when the distance is equal to or less than the second size,
 wherein the first size is a size of a vector, and the second size is a size of a different vector,
 wherein each vector is represented as a polynomial,
 wherein the signature generation device stores a disturbance vector distribution table that includes, in correspondence, an upper limit on a coefficient, a lower limit on the coefficient, and a model polynomial serving as a basis for generation of the disturbance vector, and
 wherein the signature generation device randomly selects the coefficient between the upper limit and the lower limit, inclusive, multiplies the model polynomial by the selected coefficient, and treats the result as a polynomial representing the disturbance vector.

13. A signature generation method used in a signature generation device for generating signature data for target data having one of a shortest vector problem and an approximate shortest vector problem as a basis for security, in which a vector is a multi-dimensional representation of data divided into a plurality of pieces, the signature generation method comprising the steps of:
 acquiring, using the signature generation device, the target data;
 converting, using the signature generation device, the target data acquired in the acquisition step using a private disturbance vector smaller than a first size to generate a converted vector;
 generating, using the signature generation device, a signature vector for the converted vector by seeking, in a lattice whose basis vectors are determined by private key vectors, a lattice point closest to the converted vector and selecting a part of the signature vector as signature data; and
 outputting, using the signature generation device, the target data and the signature data,
 wherein the first size is a size of a vector, and the second size is a size of a different vector,
 wherein each vector is represented as a polynomial,
 wherein the signature generation device stores a disturbance vector distribution table that includes, in correspondence, an upper limit on a coefficient, a lower limit on the coefficient, and a model polynomial serving as a basis for generation of the disturbance vector, and
 wherein the converting step randomly selects the coefficient between the upper limit and the lower limit, inclusive, multiplies the model polynomial by the selected coefficient, and treats the result as a polynomial representing the disturbance vector.

14. A non-transitory computer readable recording medium on which is recorded a computer program for signature generation used in a computer that generates signature data for target data having one of a shortest vector problem and an approximate shortest vector problem as a basis for security, in which a vector is a multi-dimensional representation of data divided into a plurality of pieces, the computer program causing the computer to perform the steps of:
 acquiring the target data;
 converting the target data acquired in the acquisition step using a private disturbance vector smaller than a first size to generate a converted vector;
 generating a signature vector for the converted vector by seeking, in a lattice whose basis vectors are determined by private key vectors, a lattice point closest to the converted vector and selecting a part of the signature vector as signature data; and
 outputting the target data and the signature data,
 wherein the first size is a size of a vector, and the second size is a size of a different vector,
 wherein each vector is represented as a polynomial,
 wherein the computer stores a disturbance vector distribution table that includes, in correspondence, an upper limit on a coefficient, a lower limit on the coefficient, and a model polynomial serving as a basis for generation of the disturbance vector, and
 wherein the converting step randomly selects the coefficient between the upper limit and the lower limit, inclusive, multiplies the model polynomial by the selected coefficient, and treats the result as a polynomial representing the disturbance vector.

15. A system comprising a signature generation device for generating signature data and a signature verification device for verifying signature data, the devices having one of a shortest vector problem and an approximate shortest vector problem as a basis for security, in which a vector is a multi-dimensional representation of data divided into a plurality of pieces,
 the signature generation device comprising:
 an acquisition unit operable to acquire the target data;
 a private storage unit confidentially storing private key vectors;
 a data conversion unit operable convert the target data acquired by the acquisition unit using a private disturbance vector smaller than a first size to generate a converted vector;
 a signature generation unit operable to generate a signature vector for the converted vector by seeking, in a lattice whose basis vectors are determined by private key vectors, a lattice point closest to the converted vector and to select a part of the signature vector as signature data; and
 an output unit operable to output the target data and the signature data, and
 the signature verification device comprising:
 an acquisition unit operable to acquire the target data and the signature data;
 a storage unit storing public key vectors;
 a verification unit operable to recover the signature vector with the public key vectors and the signature data, thus yielding a recovered signature vector, and to verify whether a distance between a vector representing the target data and the recovered signature vector is equal to or less than a second size that is larger than the first size; and an output unit operable to output information indicating that verification is successful when the distance is equal to or less than the second size, wherein the first size is a size of a vector, and the second size is a size of a different vector, wherein each vector is represented as a polynomial, wherein the private storage unit further stores a disturbance vector distribution table that includes, in correspondence, an upper limit on a coefficient, a lower limit on the coefficient, and a model polynomial serving as a basis for generation of the disturbance vector, and wherein the data conversion unit randomly selects the coefficient between the upper limit and the lower limit, inclusive, multiplies the model polynomial by the selected coefficient, and treats the result as a polynomial representing the disturbance vector.

16. The signature generation device of claim 5,
wherein the output unit keeps the converted vector confidential, without outputting the converted vector.

17. The signature generation device of claim 2,
wherein the second size is a value yielded by adding Normbound to the first size, Normbound being a threshold used in an NTRU signature scheme.

18. The signature generation device of claim 2,
wherein the data conversion unit generates the converted vector by one of (i) adding the disturbance vector to the target data, (ii) subtracting the disturbance vector from the target data, and (iii) adding to the target data vector yielded by multiplying the disturbance vector by n, n being an integer other than zero.

19. The signature generation device of claim 2,
wherein the disturbance vector distribution table stores, for each of a plurality of pieces of distribution information, an upper limit on a coefficient, a lower limit on the coefficient, and a first model polynomial and a second model polynomial that serve as a basis for generation of the disturbance vector, wherein for each of the pieces of the distribution information, the data conversion unit randomly selects a value between the upper limit and the lower limit, inclusive, generates a first polynomial by multiplying the first model polynomial by the selected value, and generates a first disturbance vector polynomial by summing the first polynomial obtained for each of the pieces of the distribution information, wherein for each of the pieces of the distribution information, the data conversion unit randomly selects a value between the upper limit and the lower limit, inclusive, generates a second polynomial by multiplying the second model polynomial by the selected value, and generates a second disturbance vector polynomial by summing the second polynomial obtained for each of the pieces of the distribution information, and wherein the data conversion unit treats the first disturbance vector polynomial and the second disturbance vector polynomial as polynomials representing the disturbance vector.

20. The signature generation device of claim 2,
wherein the disturbance vector distribution table stores, for each of a plurality of pieces of distribution information, a set of a first upper limit on a coefficient, a first lower limit on the coefficient, and a first model polynomial that serves as a basis for generation of the disturbance vector, and a set of a second upper limit on a coefficient, a second lower limit on the coefficient, and a second model polynomial that serves as a basis for generation of the disturbance vector, wherein for each of the pieces of the distribution information, the data conversion unit randomly selects a value between the first upper limit and the first lower limit, inclusive, generates a first polynomial by multiplying the first model polynomial by the selected value, and generates a first disturbance vector polynomial by summing the first polynomial obtained for each of the pieces of the distribution information, wherein for each of the pieces of the distribution information, the data conversion unit randomly selects a value between the second upper limit and the second lower limit, inclusive, generates a second polynomial by multiplying the second model polynomial by the selected value, and generates a second disturbance vector polynomial by summing the second polynomial obtained for each of the pieces of the distribution information, and wherein the data conversion unit treats the first disturbance vector polynomial and the second disturbance vector polynomial as polynomials representing the disturbance vector.

\* \* \* \* \*